United States Patent
O'Connell

(10) Patent No.: US 7,327,399 B2
(45) Date of Patent: Feb. 5, 2008

(54) METHOD AND A CIRCUIT FOR DERIVING A SYNCHRONISATION SIGNAL FROM A VIDEO SIGNAL

(75) Inventor: Niall Daniel O'Connell, Limerick (IE)

(73) Assignee: Analog Devices, Inc., Norwood, MA (US)

( * ) Notice: Subject to any disclaimer, the term of this patent is extended or adjusted under 35 U.S.C. 154(b) by 432 days.

(21) Appl. No.: 10/879,248

(22) Filed: Jun. 29, 2004

(65) Prior Publication Data

US 2005/0174487 A1    Aug. 11, 2005

(51) Int. Cl.
*H04N 7/00*    (2006.01)
*H04N 5/16*    (2006.01)

(52) U.S. Cl. ............... 348/465; 348/689; 348/698; 348/521

(58) Field of Classification Search ........... 348/465, 348/691, 689, 521, 525, 528, 540
See application file for complete search history.

(56) References Cited

U.S. PATENT DOCUMENTS

| | | | |
|---|---|---|---|
| 4,707,741 A | | 11/1987 | Stratton |
| 5,109,280 A | * | 4/1992 | Karlock ............... 348/705 |
| 5,486,869 A | | 1/1996 | Cooper |
| 5,596,372 A | | 1/1997 | Berman et al. |
| 5,754,250 A | | 5/1998 | Cooper |
| 6,028,642 A | | 2/2000 | Rinaldi et al. |
| 6,271,889 B1 | | 8/2001 | Böhm |
| 2006/0055435 A1 | * | 3/2006 | Heijna ............... 327/65 |

FOREIGN PATENT DOCUMENTS

| | | |
|---|---|---|
| DE | 3742488 | 6/1988 |
| GB | 2200011 | 7/1988 |
| JP | 05161031 A * | 6/1993 |

OTHER PUBLICATIONS

International search report.
Written opinion of the international searching authority.

* cited by examiner

*Primary Examiner*—Victor R. Kostak
(74) *Attorney, Agent, or Firm*—Wolf, Greenfield & Sacks, P.C.

(57) ABSTRACT

A method for deriving a synchronisation signal (35) from a video signal comprises tracking the blanking level (107) of the video signal with first and second slice level signals (26, 27) and tracking the sync tip level (110) of the horizontal sync signal (109) of the video signal with third and fourth slice level signals (28,29) for determining the blanking level (107) and the sync tip level (110). A value for an intermediate slice level signal (30) is computed from the first, second, third and fourth slice level signals (26, 27, 28, 29) so that the value of the intermediate slice level signal (30) lies approximately halfway between the blanking level (107) and the sync tip level (110). The video signal is compared with the intermediate slice level signal (30), and the synchronisation signal (35) is prepared from a logic signal by transitioning the logic signal from one of the logic high and logic low levels to the other of the logic high and logic low levels, each time the video signal transitions across the intermediate slice level signal (30).

52 Claims, 15 Drawing Sheets

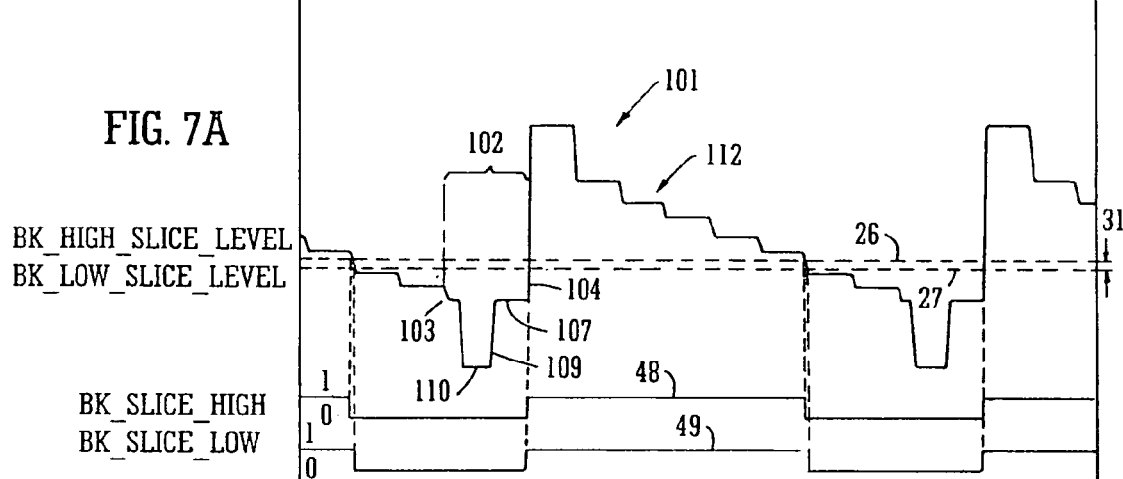
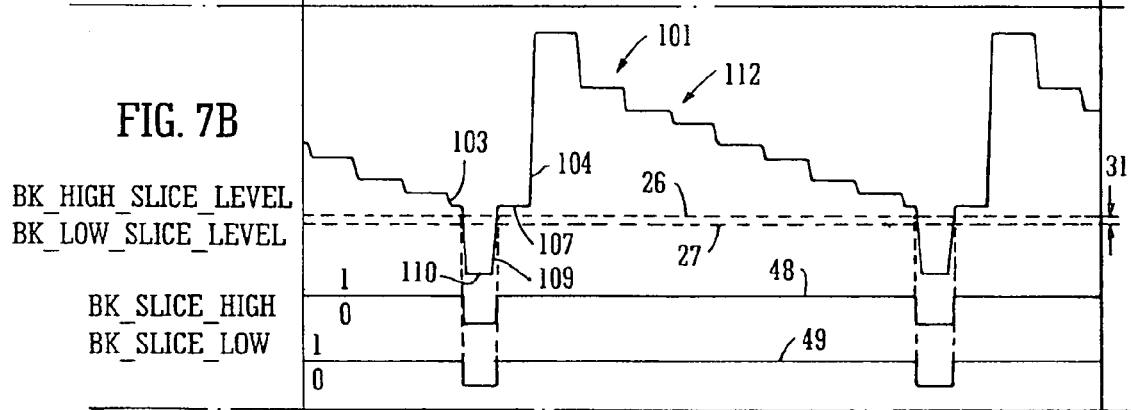
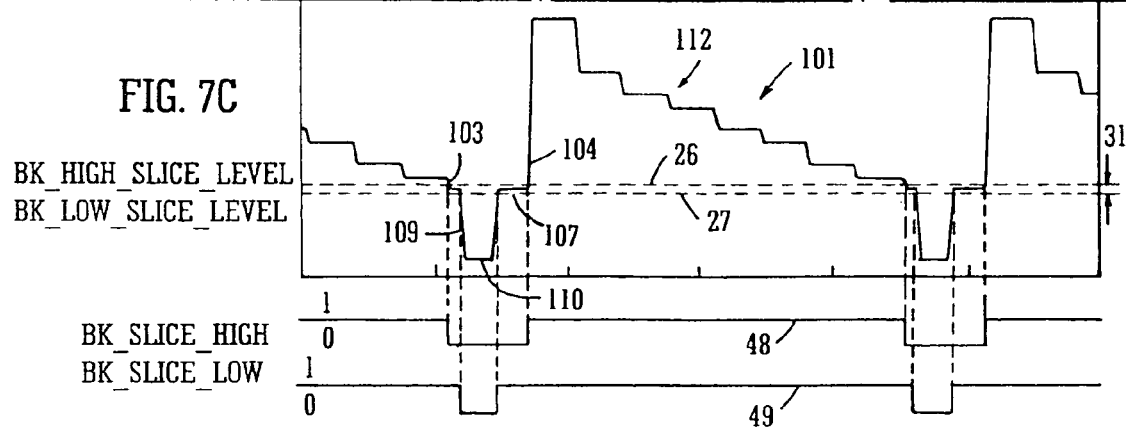

METHOD AND A CIRCUIT FOR DERIVING A SYNCHRONISATION SIGNAL FROM A VIDEO SIGNAL

FIELD OF THE INVENTION

The present invention relates to a method and a circuit for deriving a synchronisation signal from a video signal, and in particular, to a method and a circuit for deriving a synchronisation signal from a video signal which permits recovery of a horizontal sync signal from the video signal.

BACKGROUND TO THE INVENTION

Methods and circuits for recovering sync signals from a video signal are known. Such methods and circuits may be adapted for recovering the sync signals sequentially or simultaneously with active processing and decoding of the video signal. However, entire recovery of the sync signals sequentially with the active processing and decoding of the video signal, in general, militates against fast lock-in of the video signal. Accordingly, in order to minimise lock-In time, it is known to pass a video signal through two circuits in parallel, one of which carries out active signal processing and decoding of the video signal, and the other circuit which recovers the sync signals, simultaneously with the processing of the video signal.

Video signal characteristics can vary significantly from one video signal to another, and indeed, within the same video signal. For example, in a nominal one volt video signal, the horizontal sync signal amplitude from the blanking level is nominally 300 mV. However, the amplitude of the horizontal sync signal can range from 10% to 200% of the nominal value of 300 mV. Additionally, signals with low signal to noise ratio which may be received, for example, from a radio frequency (RF) tuner may have noise levels which can mask the horizontal sync signals. Additionally, video signals may be AC coupled or DC coupled, and in the case of AC coupled video signals the DC voltage level of the video signal may vary significantly with the video content. Another problem with video signals, particularly those provided from mechanical recording devices, such as VCR devices, is that the video signal may suffer from several different defects, such as significant steps in the DC voltage level between fields, and indeed, false or missing sync signals may occur from time to time.

One method which is commonly employed for recovering sync signals, requires comparing the video signal with a slice level signal. The value of the slice level signal is generally selected to be midway between the expected value of the blanking level of the video signal and the expected value of the sync tip level of the horizontal sync signal of the video signal.

Some such methods use a fixed slice level, others adjust the slice level in response to the detected amplitude or noise level of the input video signal. However, known methods for setting the slice level require directly measuring the values of the sync tip level and back porch sections of the video signal. These methods require detection of the rising and falling edges of the horizontal sync signal, which in general is carried out by monitoring for a reasonably large positive or negative edge of the video signal, and setting a measuring window for a time thereafter during which the signal level is sampled or accumulated. Once the location of the rising and falling edges of the horizontal sync signal have been determined, the values of the blanking level of the video signal and the sync tip level of the horizontal sync signal can then be measured, and the appropriate setting for the slice level signal can be computed from the values of the blanking level and the sync tip level of the video signal. However, this type of method suffers from the disadvantage that the active region of a video signal may include shapes which replicate a horizontal sync signal, and the detection of such shapes would result in the erroneous determination of the location of the horizontal sync signal, and in turn the erroneous determination of the values of the blanking level and sync tip level of the video signal.

U.S. Pat. No. 6,271,889 of Böhm discloses a method for overcoming this problem. However, the method of Böhm requires that the sync tip levels of the horizontal sync signal of the input video signal should be within a relatively narrow range. Accordingly, the method of Böhm is unsuitable where the amplitude of the horizontal sync signal varies widely. The method of Böhm requires that the input video signal is differentiated in order to locate the rising and falling edges of the horizontal sync signal. The results of the differentiation of the video signal are compared with a positive threshold for determining a valid rising edge, and a negative threshold for determining a valid falling edge. However, these thresholds must be large enough to reject edges caused by noise, and small enough to accept edges representative of the likely range in the amplitudes of the horizontal sync signals in the video signal. Since the horizontal sync signals in some video signals may have been clipped or reduced to the extent that the amplitude of the horizontal sync signal is as low as ten percent of its nominal value, and thus the lowest expected amplitude of the horizontal sync signal of the input video signal may be of an order of magnitude less than the highest expected amplitude of the horizontal sync signal. Accordingly, a serious conflict arises between the chosen thresholds for edge detection in the method of Böhm, and thus, the range of amplitudes of horizontal sync signals of a video signal with which the method of Böhm can operate lies within the range of the nominal amplitude and approximately fifty percent of the nominal amplitude of the horizontal sync signal.

Accordingly, there is a need for a method and a circuit for deriving a synchronisation signal from a video signal, and in particular, there is need for a method and a circuit for deriving a synchronisation signal from a video signal which permits recovery of the horizontal sync signal from the video signal which overcomes the problems of known methods and circuits, and in particular, which facilitates relatively rapid lock-in of the video signal.

The present invention is directed towards providing such a method and a circuit.

SUMMARY OF THE INVENTION

According to the invention there is provided a method for deriving a synchronisation signal from a video signal having a synchronisation pulse signal therein, the method comprising the steps of:

selecting a value of at least one of a first slice level signal and a second slice level signal, the at least one of the first and second slice level signals being of selectable value, and the first and second slice level signals defining a first amplitude band width therebetween, the selected value of the at least one of the first and second slice level signals being such that the second slice level signal lies on the side of the first slice level signal in a direction similar to that from which the synchronisation pulse signal is expected to extend from the blanking level of the video signal, and the value of the blanking level of the video signal lies within the respective values of the first and second slice level signals, deriving a value of an intermediate slice level signal from the current value of at least one of the first and second slice level signals and the current value of a signal indicative of the value of the sync tip of the synchronisation pulse signal of the video signal, so that the value of the intermediate slice level signal lies intermediate the current value of the at least one of the first and second slice level signals and the current value of the signal indicative of the value of the sync tip of the synchronisation pulse signal of the video signal, comparing the video signal with the intermediate slice level signal, and producing the synchronisation signal by providing a logic signal at one of a logic high level and a logic low level and transitioning the logic signal from the one of the logic high level and the logic low level to the other of the logic high level and the logic low level in response to the value of the video signal transitioning in at least one direction across the value of the intermediate slice level signal.

Preferably, the value of the video signal is compared with the current value of the first slice level signal for determining first periods of the video signal during which the value of the video signal lies to the side of the current value of the first slice level signal as that to which the current value of the second slice level signal lies during a measuring period of predetermined length, and the value of the video signal is compared with the current value of the second slice level signal for determining second periods of the video signal during which the value of the video signal lies to the side of the current value of the second slice level signal opposite to that to which the current value of the first slice level signal lies during the measuring period, the first periods being compared with a first reference period and the second periods being compared with a second reference period for determining if the blanking level of the video signal lies within the current values of the first and second slice level signals, the second reference period being less than the first reference period.

In one embodiment of the invention the second periods are compared with the first reference period for determining if the blanking level of the video signal lies within the current values of the first and second slice level signals.

In another embodiment of the invention the video signal is sampled at a predetermined sampling rate during the measuring period for determining the first and second periods.

In one embodiment of the invention the first periods are summed prior to being compared with the first reference period, and the second periods are summed prior to being compared with the second reference period.

In one embodiment of the invention the sum of the first periods is determined by counting the number of samples of the video signal the values of which correspond to the first periods, and the sum of the second periods is determined by counting the number of samples of the video signal the values of which correspond to the second periods.

In another embodiment of the invention a first logic signal is derived from the comparison of the value of the video signal with the first slice level signal, the first logic signal being set at one of a logic high level and a logic low level during the first periods of the video signal, and at the other of the logic high level and logic low level when the value of the video signal does not correspond to the first periods, and a second logic signal is derived from the comparison of the value of the video signal with the second slice level signal, the second logic signal being set at one of a logic high level and a logic low level during the second periods of the video signal, and at the other of the logic high level and logic low level when the value of the video signal does not correspond to the second periods, the first and second logic signals being integrated during the measuring period, and one of the maximum and minimum values of the integrated signal of the first logic signal being compared with the first reference period, and one of the maximum and minimum values of the integrated signal of the second logic signal being compared with the second reference period for determining if the blanking level of the video signal lies within the current values of the first and second slice level signals.

Preferably, the first reference period corresponds to a period not greater than a period representative of the duration of the number of blanking periods which the video signal should contain during the measuring period.

Advantageously, the first reference period corresponds to a period greater than a period representative of the duration of the number of synchronisation pulse signals which the video signal should contain during the measuring period.

In one embodiment of the invention the measuring period corresponds to one line of video data of the video signal, and the duration of the first reference period is less than 9 microseconds. Preferably, the duration of the first reference period is approximately 7.5 microseconds.

In another embodiment of the invention the second reference period corresponds to a period not greater than a period representative of the duration of the number of synchronisation pulse signals which the video signal should contain during the measuring period.

In one embodiment of the invention the measuring period corresponds to one fine of video data of the video signal, and the duration of the second reference period is not greater than 4.7 microseconds. Preferably, the duration of the second reference period is approximately 3 microseconds.

Advantageously, the value of the at least one of the first and second slice level signals selected in a previous measuring period is altered in response to the comparison of the first and second periods with the first and second reference periods, respectively, in at least two subsequent measuring periods indicating that the value of the at least one of the first and second slice level signals should be selected for moving the first and second slice level signals consecutively in the same direction in each of the at least two subsequent measuring periods.

In one embodiment of the invention the values of the first and second slice level signals are incremented by a first predetermined increment if the synchronisation pulse signal of the video signal is a negative going pulse, and the sum of the first periods in the measuring period is less than the first reference period, or the sum of the second periods in the measuring period is less than the second reference period.

In another embodiment of the invention the values of the first and second slice level signals are decremented by a first predetermined decrement if the synchronisation pulse signal of the video signal is a negative going pulse, and the sum of the second periods in the measuring period is greater than the first reference period.

Preferably, each first predetermined decrement is of value similar to each first predetermined increment.

Preferably, the value of the at least one of the first and second slice level signals is initially selected so that the values of the first and second slice level signals lie between the expected values of the blanking level and the sync tip of the synchronisation pulse signal of the video signal.

In one embodiment of the invention the value of the intermediate slice level signal is derived from the current value of the first slice level signal when the first amplitude band width does not exceed a first predetermined proportion of the expected difference between the expected values of the blanking level and the sync tip of the synchronisation pulse signal of the video signal.

In another embodiment of the invention the value of the intermediate slice level signal is derived from the average of the current values of the first and second slice level signals when the first amplitude band width exceeds the first predetermined proportion of the difference between the expected values of the blanking level and the sync tip of the synchronisation pulse signal of the video signal.

Preferably, the width of the first amplitude band width is selected in response to noise in the video signal.

Advantageously, the value of the first slice level signal is selectable, and the value of the second slice level signal is dependent on the selected value of the first slice level signal.

In one embodiment of the invention the method further comprises selecting a value of at least one of a third slice level signal and a fourth slice level signal, the at least one of the third and fourth slice level signals being of selectable value, and the third and fourth slice level signals defining a second amplitude band width therebetween, is the value of the at least one of the third and fourth slice level signals being selected so that the value of the sync tip of the synchronisation pulse signal of the video signal lies between the values of the third and fourth slice level signals, with the value of the third slice level signal lying intermediate the values of the second and the fourth slice level signals, and the current value of the signal indicative of the current value of the sync tip of the synchronisation pulse signal of the video signal being derived from the current value of at least one of the third and fourth slice level signals.

In one embodiment of the invention the value of the video signal is compared with the current value of the third slice level signal for determining third periods of the video signal during which the value of the video signal lies to the side of the current value of the third slice level signal as that to which the current value of the fourth slice level signal lies during the measuring period, and the value of the video signal is compared with the fourth slice level signal for determining fourth periods of the video signal during which the value of the video signal lies to the side of the current value of the fourth slice level signal opposite to that to which the current value of the third slice level signal lies during the measuring period, the third periods being compared with the second reference period, and the fourth periods being compared with a third reference period for determining if the value of the sync tip of the synchronisation pulse signal lies within the current values of the third and fourth slice level signals, the third reference period being less than the second reference period.

In another embodiment of the invention the third periods are summed prior to being compared with the second reference period, and the fourth periods are summed prior to being compared with the third reference period.

In another embodiment of the invention a third logic signal is derived from the comparison of the value of the video signal with the third slice level signal, the third logic signal being set at one of a logic high level and a logic low level during the third periods of the video signal, and at the other of the logic high level and logic low level when the value of the video signal does not correspond to the third periods, and a fourth logic signal is derived from the comparison of the value of the video signal with the fourth slice level signal, the fourth logic signal being set at one of a logic high level and a logic low level when the value of the video signal corresponds to the fourth periods and at the other of the logic high level and logic low level when the value of the video signal does not correspond to the fourth periods, the third and fourth logic signals being integrated during each measuring period, and one of the maximum and minimum values of the third logic signal being compared with the second reference period, and one of the maximum and minimum values of the integrated fourth logic signal being compared with the third reference period for determining if the value of the sync tip of the synchronisation pulse signal lies within the current values of the third and fourth slice level signals.

Preferably, the third reference period corresponds to a period not greater than a period representative of the duration of the periods during which the value of the video signal would be expected to lie to the side of the value of the sync tip of the synchronisation pulse signal of the video signal to which the fourth slice level signal should lie as a result of noise during the measuring period.

In one embodiment of the invention the measuring period corresponds to one line of video data of the video signal, and the duration of the third reference period is approximately 0.75 microseconds.

Preferably, the value of the at least one of the third and fourth slice level signals selected in a previous measuring period is altered in response to the comparison of the third and fourth periods with the second and third reference periods, respectively, in at least two subsequent measuring periods indicating that the value of the at least one of the third and fourth slice level signals should be selected for moving the third and fourth slice level signals consecutively in the same direction.

In one embodiment of the invention the values of the third and fourth slice level signals are incremented by a second predetermined increment if the synchronisation pulse signal of the video signal is a negative going pulse, and the sum of the third periods in the measuring period is less than the second reference period, or the sum of the fourth periods in the measuring period is less than the third reference period.

In another embodiment of the invention the values of the third and fourth slice level signals are decremented by a second predetermined decrement if the synchronisation pulse signal of the video signal is a negative going pulse, and the sum of the third periods in the measuring period is greater than the first reference period, or the sum of the fourth periods in the measuring period is greater than the second reference period.

Preferably, each second predetermined decrement is of value similar to each second predetermined increment.

In one embodiment of the invention the value of the intermediate slice level signal is derived from the current value of the third slice level signal when the second amplitude band width does not exceed a second predetermined proportion of the difference between the expected current values of the blanking level and the sync tip of the synchronisation pulse signal of the video signal.

In another embodiment of the invention the value of the intermediate slice level signal is derived from the average of the current values of the third and fourth slice level signals when the second amplitude band width exceeds the second predetermined proportion of the difference between the expected values of the sync tip of the synchronisation pulse signal of the video signal.

Preferably, the width of the second amplitude band width is selected in response to noise in the video signal.

Advantageously, the value of the third slice level signal is selectable, and the value of the fourth slice level is dependent on the value of the third slice level signal.

In one embodiment of the invention the value of the at least one of the third and fourth slice level signals is initially selected so that the expected value of the sync tip of the synchronisation pulse signal of the video signal lies within the third and fourth slice level signals.

Preferably, the logic signal from which the synchronisation signal is produced is transitioned between the logic high and the logic low levels in response to each transition of the value of the video signal across the value of the intermediate slice level signal, the logic signal being transitioned from one of the logic high level and the logic low level to the other of the logic high level and the logic low level in response to the value of the video signal transitioning in one direction across the value of the intermediate slice level signal, and the logic signal being transitioned in the reverse direction in response to the value of the video signal transitioning in the reverse direction across the value of the intermediate slice level signal for producing the synchronisation signal with a synchronisation pulse signal.

In one embodiment of the invention a clamp and gain circuit for clamping and gaining the video signal is responsive to the current value of at least one of the first and second slice level signals for determining the blanking level of the video signal.

In another embodiment of the invention the clamp and gain circuit is responsive to the current value of the signal indicative of the value of the sync tip of the synchronisation pulse signal of the video signal.

Preferably, the clamp and gain circuit is responsive to the current value of at least one of the third and fourth slice level signals.

In one embodiment of the invention the measuring period corresponds to one line of video data of the video signal, and the video signal is continuously subjected to the method during consecutive measuring periods.

Preferably, the video signal is clamped to a reference signal, and the values of the first and second slice level signals are initially determined from the reference signal, and advantageously, the values of the third and fourth slice level signals are initially determined from the reference signal.

In a further embodiment of the invention the video signal is passed through a low pass filter for filtering out high frequency video data and noise from the video signal prior to selection of the value of the at least one of the first and second slice level signals.

Preferably, the portion of the video signal corresponding to the synchronisation pulse signal after the video signal has been passed through the low pass filter is compared with the corresponding portion of the video signal prior to the video signal being passed through the low pass filter for determining the noise level in the video signal prior to selecting the width of the first amplitude band width.

In one embodiment of the invention the synchronisation pulse signal of the video signal is a horizontal synchronisation pulse signal.

Additionally, the invention provides a synchronisation signal generating circuit for generating a synchronisation signal from a video signal having a synchronisation pulse signal therein, the synchronisation signal generating circuit comprising:

a circuit for generating a first slice level signal and a second slice level signal such that the first and second slice level signals define a first amplitude band width therebetween, the value of at least one of the first and second slice level signals being selectable, a circuit for selecting the value of the at least one of the first and second slice level signals, the value of which is selectable so that the second slice level signal lies on the side of the first slice level signal in a direction similar to that from which the sync pulse signal is expected to extend from the blanking level of the video signal, and the value of the blanking level of the video signal lies within the respective values of the first and second slice level signals, a circuit for deriving a value of an intermediate slice level signal from the current value of at least one of the first and second slice level signals and the current value of a signal indicative of the current value of the sync tip of the synchronisation pulse signal of the video signal, so that the value of the intermediate slice level signal lies intermediate the current value of the at least one of the first and second slice level signals and the current value of the signal indicative of the value of the sync tip of the synchronisation pulse signal of the video signal, a circuit for comparing the video signal with the intermediate slice level signal, and a circuit for producing the synchronisation signal by providing a logic signal at one of a logic high level and a logic low level and transitioning the logic signal from the one of the logic high level and the logic low level to the other of the logic high level and the logic low level in response to the value of the video signal transitioning in at least one direction across the value of the intermediate slice level signal.

In one embodiment of the invention a clamp and gain circuit is provided for clamping and gaining the video signal, the clamp and gain circuit being responsive to the current value of at least one of the first and second slice level signals for determining the blanking level of the video signal.

In another embodiment of the invention the clamp and gain circuit is responsive to the current value of the signal indicative of the value of the sync tip of the synchronisation pulse of the video signal.

The invention also provides a synchronisation pulse signal recovery circuit for recovering a synchronisation pulse signal from a video signal, the synchronisation signal recovery circuit comprising the synchronisation signal generating circuit according to the invention.

Further the invention provides a video signal decoding circuit comprising an active video signal processing and decoding stage, and a synchronisation signal recovery circuit according to the invention for recovering a synchronisation pulse signal from the video signal, the synchronisation pulse signal recovery circuit being in parallel with the video signal processing and decoding circuit.

ADVANTAGES OF THE INVENTION

The advantages of the invention are many. The method according to the invention permits a relatively accurate determination to be made of the location of a horizontal sync signal in a video signal, and in particular, permits an accurate determination of the location of the horizontal sync signal to be made relatively rapidly. By virtue of the fact that the location of the horizontal sync signal can be determined relatively rapidly, relatively rapid lock-in of the video signal can be achieved. Furthermore, the fact that the method according to the invention for deriving the synchronisation signal from which the horizontal sync signal can be recovered can be carried out simultaneously with active processing and decoding of the video signal, further increases the speed with which the location of the horizontal sync signal can be determined, thus further facilitating rapid lock-in of the video signal.

The method according to the invention is particularly suitable for use with video signals in which the sync tip level of the horizontal sync signal varies widely. By virtue of the fact that the values of the first and second slice level signals are selected for tracking the blanking level of the video signal, and the values of the third and fourth slice level signals are selected for tracking the sync tip level of the horizontal sync signal, the current values of the first and second slice level signals closely track the blanking level, and the current values of the third and fourth slice level signals closely track the sync tip level of the horizontal sync signal, and accordingly, the value of the intermediate slice level signal is relatively accurately selected to lie at any desired position intermediate the blanking level and the sync tip level of the horizontal sync signal, and typically, approximately halfway between the blanking level and the sync tip level of the horizontal sync signal. Although in some cases it may be desirable to locate the intermediate slice level signal closer to the sync tip level of the horizontal sync tip signal than to the blanking level, and indeed vice versa. Furthermore, by virtue of the fact that the video signal is continuously being monitored by the method, and the values of the first and second slice level signals and the third and fourth slice level signals are appropriately varied in order to maintain tracking of the blanking level and the sync tip level of the horizontal sync signal by the first and second slice level signals and the third and fourth slice level signals, respectively, the current value of the intermediate slice level signal virtually always follows changes in the blanking level and the sync tip level of the horizontal sync signal of the video signal. Accordingly, the method according to the invention is particularly suitable for use with video signals in which the sync tip level of the horizontal sync signal varies widely, and the DC voltage of the video signal also varies widely. Thus, the method according to the invention can be used with video signals whether the video signal is a DC coupled signal or an AC coupled signal, and irrespective of whether the DC level of the video signal varies.

Additionally, a missing horizontal sync signal in a line of video data of the video signal will not affect the method according to the invention, since the horizontal sync signal will be picked up by the method according to the invention in the next line of the video signal, or in subsequent lines of the video signal as soon as the horizontal sync signal again appears.

A further advantage of the method according to the invention is that it permits the value of the intermediate slice level signal to be initially determined prior to the values of the first and second slice level signals and the third and fourth slice level signals having been accurately selected for bounding the blanking level and the sync tip level of the horizontal sync signals of the video signal, respectively, therebetween.

Furthermore, there is no necessity to directly determine the blanking level or the sync tip level of the horizontal sync signal of the video signal as is required in other known methods.

Additionally, clamping of the video signal can be carried out relatively rapidly, and in general, the video signal can be clamped within a few lines of video data of the video signal. Similarly, the value of the intermediate slice level signal can likewise be determined within a few lines of video data of the video signal. Furthermore, as the method according to the invention is applied to subsequent lines of video data of the video signal, the value of the intermediate slice level signal is further refined using the method according to the invention.

A further advantage of the invention is that the value of the intermediate slice level signal can be determined without the need for locating positive going and negative going edges of the video signal, thereby avoiding any danger of a portion of the active video signal being misinterpreted as forming a horizontal sync signal.

Additionally, by virtue of the fact that by using the method according to the invention it is not necessary to determine the precise values of the blanking level and the sync tip level in order to determine the intermediate slice level signal, rapid lock-in of the video signal can be achieved, and since the blanking level and the sync tip level of the horizontal sync signal are being continuously tracked, the method according to the invention does not rely on locating the sync signals by determining the shapes thereof. Accordingly, the method according to the invention reliably determines the sync pulses of the video signal in the presence of noise, copy protection pulses, and other distortions in the video signal.

Additionally, the method according to the invention provides a stable picture, even in the case of an empty channel, in other words, a channel which does not include a video signal, and accordingly, the only signal in the channel is noise, such as "snow noise". By virtue of the fact that the method clamps the signal at the short-term minimum value, the filtered noise signal is clamped at its short-term minimum value, in other words, at the negative going peaks. The third and fourth slice level signals thus track the negative peaks of the filtered noisy signal, while the first and second slice level signals settle either between the positive going and negative going peaks of the filtered noisy signal, or at the positive peaks of the filtered noisy signal, depending on the type of signal. In this way, the method according to the invention provides a stable picture. Additionally, where the method according to the invention includes the additional step of only altering previously selected values of the first, second, third and fourth slice level signals in response to a determination being made in at least two subsequent measuring periods that the values of the first, second, third and fourth slice level signals should be selected for moving the slice level signals consecutively in the same direction in each of the at least two subsequent measuring periods, the method provides an even more stable picture in a channel from which a video signal is absent. Furthermore, the provision of the additional step of only altering previously selected values of the first, second, third and fourth slice level signals in response to a determination being made in at least two subsequent measuring periods that the values of the slice level signals should be selected for moving the slice level signals consecutively in the same direction in each of the at least two subsequent measuring periods, ensures that the method according to the invention provides a particularly stable picture both in the presence or absence of a video signal.

A further advantage of the invention is that the method of the invention permits the voltage levels of the back porch of the blanking level and the sync tip level of the video signal to be determined without having to find their position in time, and as a result these levels can then be used to control the clamp and gain of the signal under virtually any condition of the input video signal.

The advantages of the circuits according to the invention are similar to those achieved by the method according to the invention.

The invention and its many advantages will be more clearly understood from the following description of some preferred embodiments thereof which are given by way of example only with reference to the accompanying drawings in which:

BRIEF DESCRIPTION OF THE DRAWINGS

FIG. 10D illustrates a layout showing how the portions of the flowchart of FIGS. 10A to 10C are to be assembled.

DETAILED DESCRIPTION OF THE INVENTION

Figure 1:
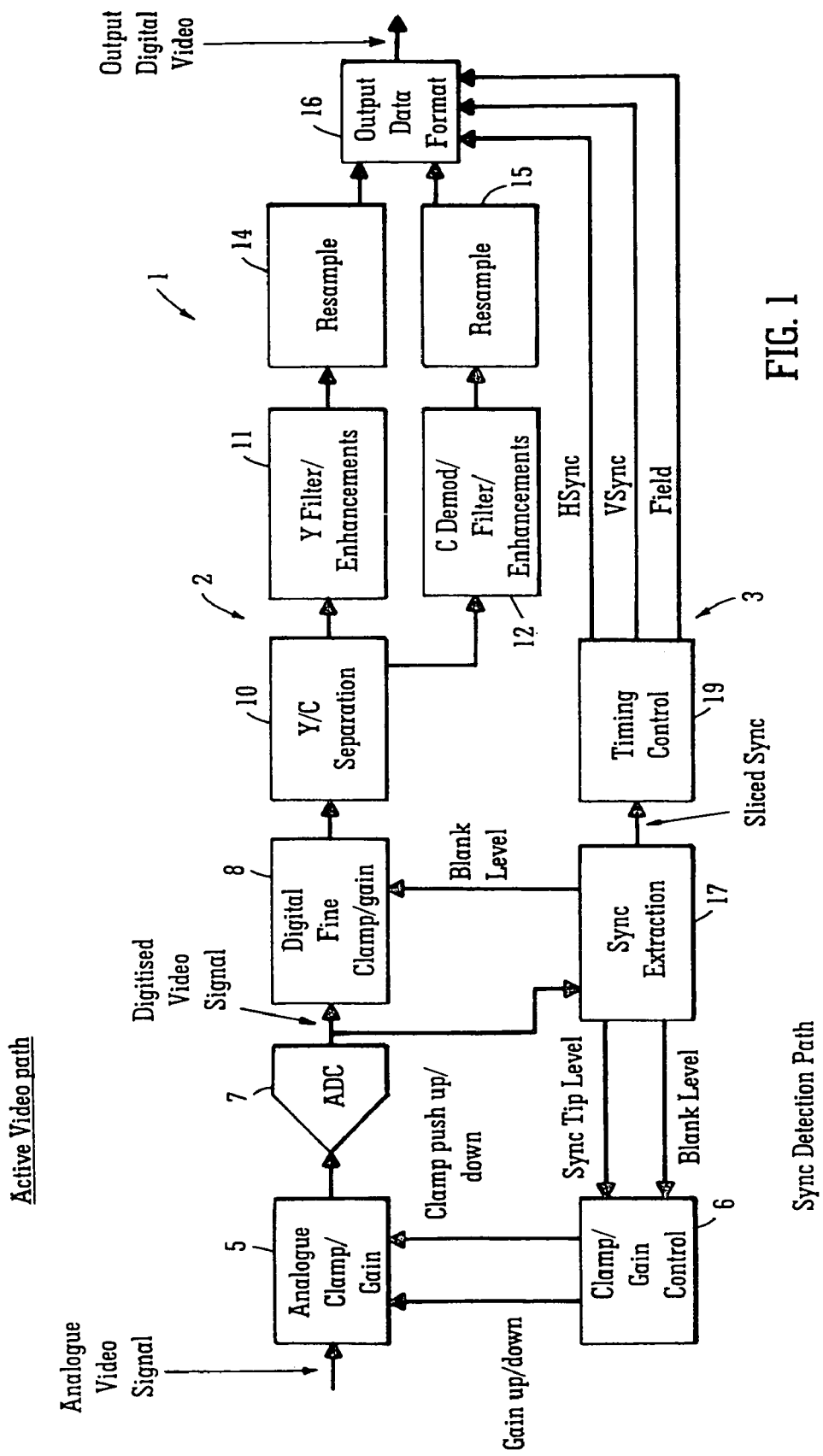
FIG. 1 is a block representation of a decoding circuit according to the invention for processing and decoding a video signal, which incorporates a synchronisation signal generating circuit also according to the invention for deriving a synchronisation signal from the video signal.

Referring to the drawings, and initially to FIGS. 1 to 4, there is illustrated a decoder according to the invention, indicated generally by the reference numeral 1, for decoding a video signal. The decoder 1 comprises an active signal processing and decoding circuit indicated generally by the reference numeral 2, and a synchronisation pulse signal recovery circuit also according to the invention indicated generally by the reference numeral 3 for implementing a method also according to the invention for deriving a synchronisation signal from the video signal, from which a horizontal sync signal of the video signal is recovered, and in turn a vertical sync signal and a field signal are also recovered. The sync signal recovery circuit 3 is provided in parallel with the active signal processing and decoding circuit 2, so that recovery of the horizontal and vertical sync signals and the field signal is carried out by the sync signal recovery circuit 3 effectively on the fly and simultaneously with processing and decoding of the video signal in the signal processing and decoding circuit 2. The decoder 1 may be adapted for decoding any type of video signal both colour and monochrome signals, whether transmitted or received from a VCR or any other type of video source.

In this embodiment of the invention it is assumed that the horizontal sync signals extend downwardly form the blanking level of the video signal, in other words, the horizontal sync signals are negative going signals. However, if the horizontal sync signals were positive going signals from the blanking level, the video signal could be inverted prior to being applied to the decoder 1. Alternatively, if the horizontal sync signals were positive going signals from the blanking level, the method according to the invention could still be applied without inverting the video signal, however, the method would be applied in reverse, as will be readily apparent to those skilled in the art from the description given below.

Figure 5:
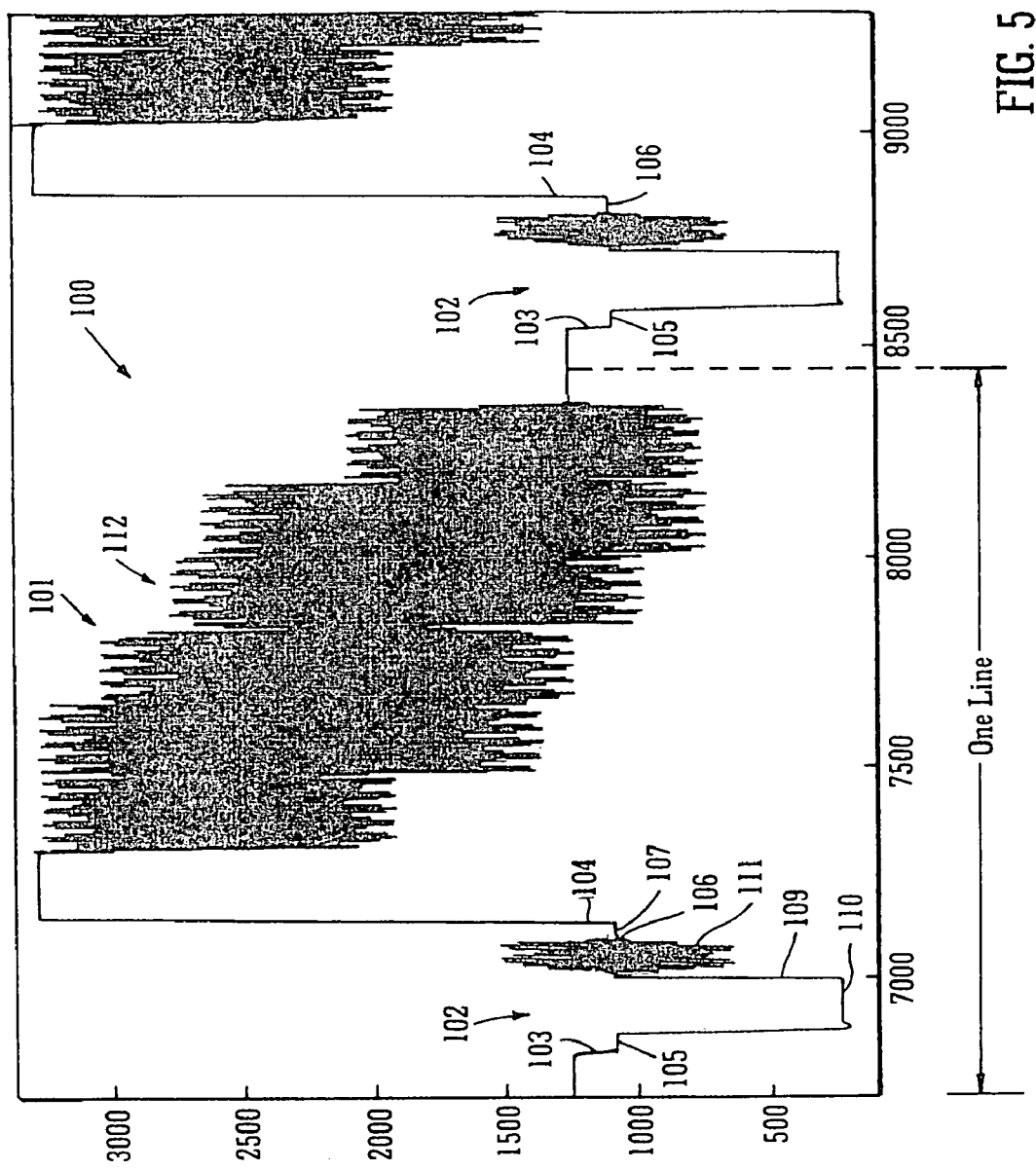
FIG. 5 is a waveform illustrating a portion of a video signal in analogue form.
Figure 6:
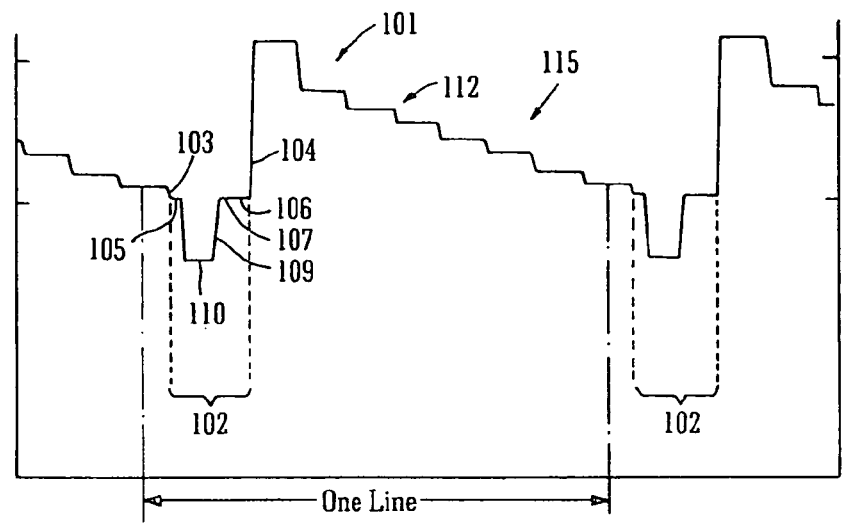
FIG. 6 is a waveform of the portion of the video signal of FIG. 5 after being low pass filtered during the carrying out of the method according to the invention for deriving the synchronisation signal from the video signal, FIGS. 7(*a*) to (*c*) illustrate the application of a part of the method according to the invention to the waveform of FIG. 6 for deriving the synchronisation signal from the video signal, FIGS. 8(*a*) to (*c*) illustrate the application of another part of the method according to the invention to the waveform of FIG. 6 for deriving the synchronisation signal from the video signal.

Before describing the decoder 1 in detail, an analogue representation of a typical video signal 100 which is illustrated in FIG. 5 will first be described. FIG. 5 illustrates one complete line 101 of video data of the video signal 100 and the beginning of the next line of video data. Each line 101 of the video signal 100 comprises a non-picture portion, which is commonly referred to as a horizontal blanking region 102, which extends between a falling edge 103 and a rising edge 104 of the video signal 100, and comprises a front porch 105, and a back porch 106. The front porch 105 and the back porch 106 lie on a portion of the video signal generally referred to as the blanking level 107. A negative going synchronisation pulse signal which is referred to as a horizontal sync signal 109 extends downwardly from the blanking level 107 to a sync tip level 110. A colour burst 111 which provides a reference for colour data contained in the video signal 100 is provided in the back porch 106 of the blanking level 107. The voltage level of the back porch 106, with the exception of the voltages of the colour burst 111 is substantially similar to the front porch 105, and the voltage of the front porch 105 defines the voltage of the blanking level 107. The remainder 112 of the video signal between successive horizontal blanking regions 102 comprises picture data including luminance data and colour data, which will be well known to those skilled in the art, and it is not intended to discuss this in detail, since it is not relevant to the present invention. However, since the colour data in the colour burst 111, and the high frequency luminance and colour data in the portion 112 are not required for the purpose of recovering the horizontal sync signals, this data is filtered from the video signal 100 by the decoder 1 as will be described below to produce a filtered video signal 115 as illustrated in FIG. 6.

Returning now to the decoder 1, and referring in particular to FIG. 1, an analogue clamp and gain stage 5 under the control of a digital clamp and gain control circuit 6 receives the video signal in analogue form and clamps and gains the video signal prior to it being digitised in an analogue to digital converter 7. The digitised signal from the analogue to digital converter 7 is applied to the signal processing and decoding circuit 2 and the sync signal recovery circuit 3: The analogue clamp and gain stage 5 clamps the video signal at a suitable voltage level for keeping the video signal within the range of the analogue to digital converter 7 under the control of the clamp and gain control circuit 6 which in turn is responsive to the sync signal recovery circuit 3, as will be described below. Although only one analogue to digital converter 7 is illustrated, the number of analogue to digital converters required will be dependent on the format type of the video signal. For example, in the case of Y/C or component video formats, a number of analogue to digital converters 7 would be required. In the case of a CVBS format signal which contains the synchronisation data, only a single analogue to digital converter 7 is required. However, in cases where additional analogue to digital converters are required for other video signal formats, the arrangement of such an analogue clamp and gain stage, and one or more analogue to digital converters will be well known to those skilled in the art, and will not be described in further detail. The analogue to digital converter 7 may be clocked by a line locked clock, a colour sub-carrier locked clock, or from a fixed frequency clock, the clock frequencies of such clocks may allow over-sampling of the video signal. In this embodiment of the invention the video signal is sampled at a sampling rate of 27 MHz.

The digitised samples of the video signal from the analogue to digital converter 7 are applied to a digital fine clamp and gain stage 8 in the active signal processing and decoding circuit 2, where the digitised signal is clamped at the blanking level under the control of a signal from the sync signal recovery circuit 3 as will be described below. The digital signal is then passed from the digital fine clamp and gain stage 8 to a Y/C separation stage 10 where the digitised signal is separated into its Y component and its C component. The Y component of the digitised signal is passed through a Y filter enhancement stage 11 for enhancing the detail, brightness and contrast of the subsequently displayed picture; A chroma demodulating, filter and enhancement stage 12 demodulates, filters and enhances the C component of the digitised signal also for enhancing the subsequently displayed picture. A re-sampling stage 14 is provided for converting the sampling rate of the video signal should this be required. The demodulated, filtered and enhanced C component of the video signal is re-sampled in a re-sampling stage 15 if required, and the processed signals from the re-sampling stage 14 and the re-sampling stage 15 are applied to an output data format stage 16, which receives-horizontal sync, vertical sync and field signals from the sync signal recovery circuit 3 as will be described below. The output data format stage 16 formats the digitised video signal which contains horizontal sync, vertical sync and field signals in the desired format, ready for further processing prior to display on a visual display.

The sync signal recovery circuit 3 comprises a sync extraction stage 17 which derives the synchronisation signal from the video signal as will be described below. The synchronisation signal from the sync extraction stage 17 is applied to a timing control stage 19, which generates the horizontal sync, the vertical sync and the field signal from the synchronisation signal, which are in turn applied to the output data format stage 16.

Figure 2:
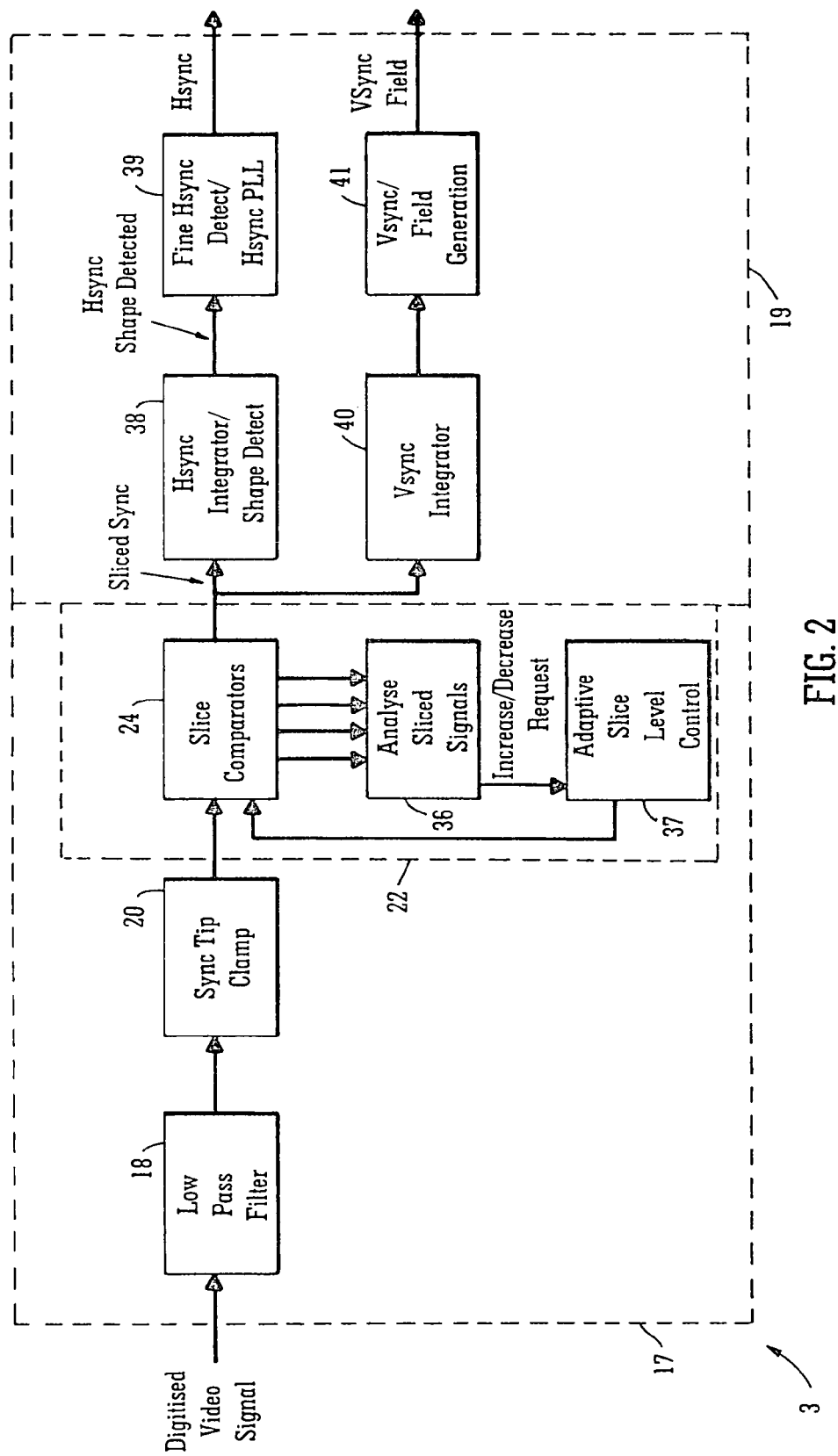
FIG. 2 is a block representation of the synchronisation signal generating circuit of FIG. 1, FIGS. 3A to 3C are portions of a flowchart illustrating the method steps carried out by a method according to the invention for deriving the synchronization signal from the video signal.

Referring now in particular to FIG. 2, the sync extraction stage 17 comprises a narrow band low pass digital filter 18 for filtering out the colour burst, high frequency luminance and chroma data from the digitised signal received from the analogue to digital converter 7 to produce the filtered signal, the analogue representation 115 of which is illustrated in FIG. 6. The filtered digital video signal from the low pass filter 18 is applied to a sync tip clamp stage 20 which clamps the sync tip level 110 of the horizontal sync signal 109 typically to code zero. The sync tip clamp stage 20 initially roughly determines the short-term minimum value of the filtered video signal which should approximately represent the sync tip level of the horizontal sync signal of the video signal. The short-term minimum value of the video signal is determined over a few lines 101 of video data, and in this embodiment of the invention over two lines of video data of the filtered video signal, and the filtered short-term value is the value which is used as the clamp value, as will be described below. The time constant of the filter is programmable so that where it is desired to rapidly clamp the video signal, the time constant of the filter may be selected to be a fast time constant, and vice versa when less rapid clamping of the video signal is desired, the faster the time constant of the filter, the more susceptible the method will be to missing horizontal sync signals in the video signal. Preferably, the time constant of the filter is selected to be in the range of ten to twenty lines of video data of the video signal.

The clamped filtered digitised video signal is applied to a synchronisation signal generating circuit 22 also according to the invention which generates the synchronisation signal using the method according to the invention, which is described in detail below with reference to the flow charts of FIG. 3. The is synchronisation signal is applied to the timing control stage 19, which generates the vertical sync, horizontal sync and field signals from the synchronisation signal, and applies the horizontal sync, the vertical sync and the field signals to the output data format stage 16.

Figure 8A:
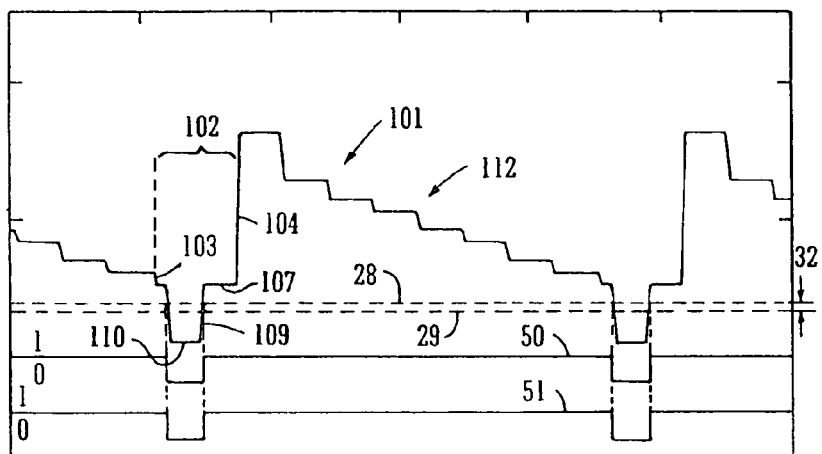
Figure 8B:
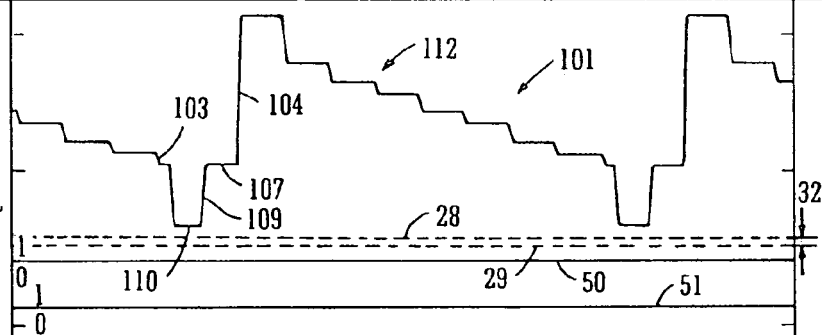

The synchronisation signal generating circuit 22 comprises a bank 24 of digital comparators, which continuously and simultaneously compare consecutive sampled values of the filtered clamped video signal with respective first and second slice level signals 26 and 27, respectively, and third and fourth slice level signals 28 and 29, respectively, see FIGS. 7 and 8, during successive measuring periods, for tracking the blanking level 107 and the sync tip level 110 of the horizontal sync signal 109 of the video signal. Each measuring period is of predetermined length, which in this embodiment of the invention is one line of video data of the video signal. Each measuring period commences immediately the preceding measuring period ends, and the measuring periods may commence at any part of a line of the video signal. The first and second slice level signals 26 and 27 define a first voltage amplitude band width 31, within which the blanking level 107 is tracked. The third and fourth slice level signals 28 and 29 defined a second voltage amplitude band width 32, within which the sync tip level 110 of the horizontal sync signal 109 is tracked. The second amplitude band width 32 in this embodiment of the invention is of width similar to the first amplitude band width 31.

In this embodiment of the invention the value of the first slice level signal 26 is selectable, and the value of the second slice level signal 27 is dependent on the selected value of the first slice level signal 26 and the first amplitude band width 31. The value of the third slice level signal 28 is selectable, and the value of the fourth slice level signal 29 is dependent on the selected value of the third slice level signal 28 and the second amplitude band width 32.

The first and second amplitude band widths 31 and 32 are selectable, and are selected in response to the noise in the video signal. If the noise level in the video signal is relatively high, the first and second amplitude band widths 31 and 32 are selected to be relatively wide in order to maintain the stability of the circuit in carrying out the method of the invention. On the other hand, if the noise level in the video signal is relatively low, the first and second amplitude band widths 31 and 32 are selected to be relatively narrow, in order to more accurately track the blanking level 107 and the sync tip level 110. When the noise level in the video signal is relatively high, the first and second amplitude band widths 31 and 32 are selected to be of value greater than a predetermined band width. The predetermined band width in this embodiment of the invention is selected to be 2% of the expected difference between the sync tip level 110 of the horizontal sync signal 109 from the blanking level 107 of the video signal. When the noise level in the video signal is relatively high, depending on the noise level, the first and second amplitude band widths may be selected to be in the range of 2% to 10% of the expected difference between the sync tip level 110 from the blanking level 107. On the other hand, if the noise level in the video signal is relatively low, the values of the first and second amplitude band widths 31 and 32 are selected to be below the predetermined band width, and preferably, in the range of 0.5% to 1.5% of the expected difference between the sync tip level 110 from the blanking level 107.

After the first and second amplitude band widths 31 and 32 have been selected, the value of the first slice level signal 26 is initially selected so that both the first and second slice level signals 26 and 27 lie between the expected values of the blanking level 107 and the sync tip level 110, with the first slice level signal 26 substantially adjacent the expected value of the blanking level signal 107, see FIG. 7(b). The third and fourth slice level signals 28 and 29 are initially selected to approximate to the expected position of the sync tip level 110, which should be at code zero, so that the third slice level signal 28 lies just above the code zero, and the fourth slice level signal 29 lies just below the code zero, see FIG. 8(c). However, in certain cases the first and second slice level signals 26 and 27 are selected to lie substantially halfway between the expected values of the blanking level 107 and the sync tip level 110. It is, however, desirable that the first and second slice level signals 26 and 27 should be selected to be below the expected value of the blanking level 107.

Once the values of the first and third slice level signals 26 and 27 and the third and fourth slice level signals 28 and 29 have been initially selected, the consecutive sampled values of the video signal are compared with the first, second, third and fourth slice level signals 26, 27, 28 and 29 by the bank of comparators 24 during the next measuring period. The outputs from the bank of comparators 24 are analysed in an analysing stage 36 to ascertain if the blanking level 107 and the sync tip level 110 of the video signal are within the selected values of the first and second slice level signals 26 and 27 and the third and fourth slice level signals 28 and 29, respectively, for tracking the blanking level 107 and the sync tip 101 of the video signal, as will be described below. If the blanking level 107 is not within the first amplitude band width 31 defined by the first and second slice level signals 26 and 27, an adaptive slice level control stage 37 appropriately increments or decrements the values of the first and second slice level signals 26 and 27, and so on during successive measuring periods in order to maintain the blanking level 107 within the first amplitude band width 31 defined by the first and second slice level signals 26 and 27, as will be described below with reference to the flow chart of FIG. 3. Similarly, if the sync tip 110 is not within the second amplitude band width 32 defined by the third and fourth slice level signals 28 and 29, the adaptive slice level control stage 37 appropriately increments or decrements the values of the third and fourth slice level signals 28 and 29, and so on during successive measuring periods in order to maintain the sync tip 110 within the second amplitude band width 32 defined by the third and fourth slice level signals 28 and 29.

Figure 9:
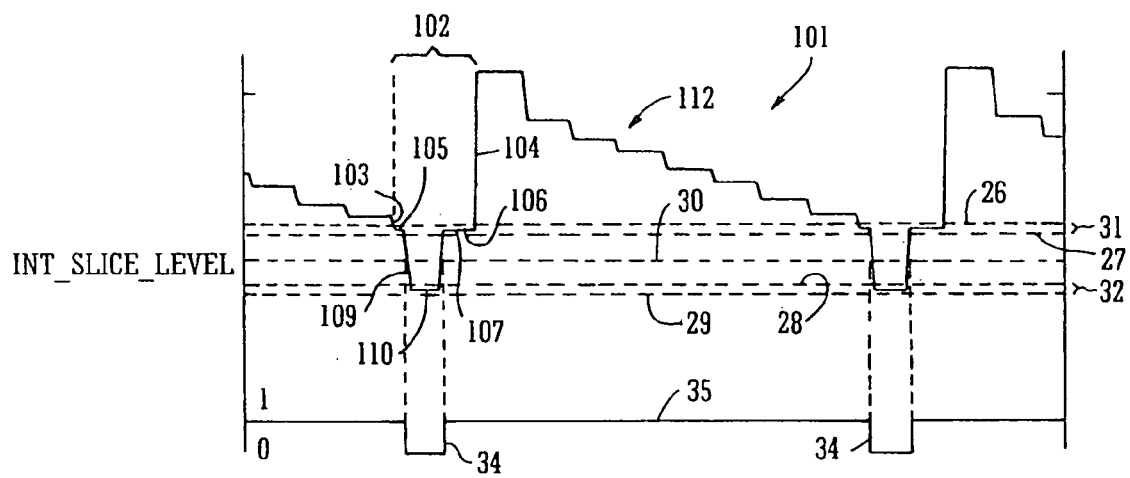
FIG. 9 illustrates the application of another part of the method according to the invention to the waveform of FIG. 6 for deriving the synchronization signal from the video signal.

Simultaneously as the values of the first and second slice level signals 26 and 27 and the third and fourth slice level signals 28 and 29 are selected, the value of an intermediate slice level signal 30 is computed, during each measuring period, from the current values of first and second, and the third and fourth slice level signals 26, 27, 28 and 29, so that the value of the intermediate slice level signal lies approximately halfway between the values of the blanking level 107 and the sync tip level 110, see FIG. 9, or at any other desired pre-selected position relative to the first, second, third and fourth slice level signals 26, 27, 28 and 29. The consecutive sampled values of the video signal are compared with the intermediate slice level signal 30 in the bank of the comparators 24 during successive measuring periods for deriving the synchronisation signal as will be described below. The synchronisation signal is illustrated in FIG. 9 and is indicated by the reference numeral 35.

If the first and second amplitude band widths 31 and 32 defined by the respective pairs of first and second slice level signals 26 and 27 and third and fourth slice level signals 28 and 29 have been selected to be of width below the predetermined band width, the value of the blanking level is determined as being the value of the first slice level signal 26, and the value of the sync tip level 110 is determined as being the value of the third slice level signal 28. Accordingly, where the value of the intermediate slice level signal 30 is to be selected to fall approximately halfway between the blanking level 107 and the sync tip level 110, the value of the intermediate slice level signal 30 is determined as the average of the values of the first and third slice level signals 26 and 28, respectively. If, on the other hand, the first and second amplitude band widths 31 and 32 have been selected to be of width above the predetermined band width, the value of the blanking level 107 is determined as the average of the values of the first and second slice level signals 26 and 27, and the value of the sync tip level 110 is determined as the average of the values of the third and fourth slice level signals 28 and 29. Accordingly, where the value of the intermediate slice level signal 30 is to be selected to fall substantially halfway between the blanking level 107 and the sync tip level 110, the value of the intermediate slice level signal 30 is determined as the average of the values of the first and second and third and fourth slice level signals 26, 27, 28 and 29, respectively. As the values of the first, second, third and fourth slice level signals 26, 27, 28 and 29 are incremented or decremented, the value of the intermediate slice level signal 30 is simultaneously appropriately altered.

The synchronisation signal 35 is produced from a logic signal by transitioning the logic signal between one of a logic high level and a logic low level in response to the video signal transitioning across the intermediate slice level signal 30. In this embodiment of the invention when the video signal transitions across the intermediate slice level signal 30 going from high to low, the logic signal is transitioned from the logic high level to the logic low level, and when the video signal transitions across the intermediate slice level signal 30 in the reverse direction, the logic signal is transitioned in the reverse direction going from the logic low level to the logic high level, thereby producing a synchronisation signal 35 with sync pulses 34 from which the horizontal sync, vertical sync and field signals are generated.

The digital clamp and gain control circuit 6 controls the clamp and gain stage 5 in response to the current values of the blanking level 107 and the sync tip level 110 determined by the synchronisation signal generating circuit 22 of the sync extraction stage 17.

The synchronisation signal 35 from the timing signal generating circuit 22 is applied to a horizontal sync integrator shape detecting circuit 38, which integrates the synchronisation signal 35 for validating the width of the sync pulses 34, and in turn detects the horizontal pulse signals. The signal with the horizontal sync pulses from the circuit 38 are applied to a fine horizontal sync detect circuit 39 which outputs the horizontal sync signal to the output data formatting stage 16. The synchronisation signal 35 from the timing signal generating circuit 22 is also fed to a vertical sync integrating circuit 40, which integrates the synchronisation signal 35 for detecting the vertical sync pulses. The signal with the vertical sync pulses from the vertical sync integrating circuit 40 are applied to a vertical sync/field signal generating circuit 41, which in turn generates the vertical sync and field signals, which are applied to the output data format stage 16.

The method for recovering the synchronisation signal 35 will now be described in detail with reference to FIGS. 7(a) to (c), 8(a) to (c) and 9. Initially an approximate value of the blanking level of the video signal 115 is determined based on the determined approximation of the horizontal sync level 110 of the horizontal sync signal 109, by adding the appropriate number of codes corresponding to the expected difference between the horizontal sync signal 109 from the blanking level 107 to the determined approximate sync tip level.

The first and second slice level signals 26 and 27 are illustrated in FIGS. 7(a) to (c), and the first slice level signal 26 is identified as a bk_high_slice_level 26. The second slice level signal 27 is identified as a bk_low_slice_level 27. As discussed above, the bk_high_slice level 26 and the bk_low_ slice_level 27 define the first amplitude band width 31, which is selected in response to the noise level of the video signal. If the noise level in the video signal is high, the values of the bk_high_slice_level 26 and the bk_low_slice_level 27 are selected so that the first amplitude band width 31 is relatively wide to facilitate stable operation of the synchronisation signal generating circuit 22. On the other hand, should the noise level of the video signal be relatively low, the values of the bk_high_slice_level 26 and the bk_low_slice_level 27 are selected so that the first amplitude band width 31 is relatively narrow. The accuracy with which the blanking level 107 of the video signal can be determined will depend upon the first amplitude band width 31, the narrower the first amplitude band width 31, the more accurate will be the determination of the blanking level 107.

Once the initial values of the bk_high_slice_level 26 and bk_low_slice_level 27 been selected by the slice level control circuit 37, the appropriate comparators of the bank of comparators 24 compare the sampled values of the video signal on each clock cycle with the bk_high_slice_level 26 and the bk_low_slice_level 27 during the next measuring period. As a result of the comparison of the consecutive sampled values of the video signal with the bk_high_ slice_level 26 and the bk_low_slice_level 27, respective first and second logic signals are generated, namely, a bk_slice_ high signal 48 and bk_slice_low signal 49, respectively. The bk_slice_high signal 48 is held at logic high for so long as the sampled values of the video signal remain above the bk_high_slice_level 26, and the bk_slice_low signal 49 is held at logic high for so long as the sampled values of the video signal remain at or above the bk_low_slice_level 27. On the sampled value of the video signal being at or below the bk_high_slice_level 26, which correspond to first periods of the video signal, the bk_slice_high logic signal 48 is set to logic low. On the sampled values of the video signal being below the bk_low_slice_level 27, which correspond to second periods of the video signal, the bk_slice_low signal 49 is set to logic low.

The normal time period of the blanking region 102 of a video signal, in other words the time period between the falling edge 103 of the video signal and the rising edge 104 is approximately 9 μsec. The normal time period of a horizontal sync signal is approximately 4.7 μsec. Since the sampling rate at which the video signal is being sampled is 27 MHz, the time period of 9 μsec of a normal blanking region corresponds to a count of approximately 240 clock cycles, namely, 240 samples. The normal time period of 4.7 μsec of a normal horizontal sync signal 109 corresponds to 127 clock cycles, in other words, 127 samples. However, in order to allow for variations in the time periods of the blanking regions 102 and horizontal sync signals 109 in various video signals, and indeed, within the same video signal, and also to allow for noise spikes giving high pulses instead of the expected lows during horizontal blanking, a count of 200 clock cycles is deemed to correspond to the time period of the blanking region 102, and a count of 80 clock cycles is deemed to correspond to a horizontal sync signal 109. Accordingly, a first reference period, in this case a first reference count is set at 200 clock cycles, against which the count of clock cycles during which the bk_slice_ high signal 48 is at logic low is compared, and a second reference period, namely, a second reference count is set at 80 cycles against which the counts of clock cycles during which the bk_slice_high signal 48 and the bk_slice_low signal 49 are at logic low are compared, as will be described below. The first reference count, therefore, corresponds to a first reference time period, in other words, the expected duration of the blanking region 102 between the falling edge 103 and the rising edge 104 of the video signal. The second reference count corresponds to a second reference time period, in other words, the duration of the horizontal sync signal 109.

In order to determine if the blanking level 107 is within the bk_high_slice_level 26 and the bk_low_slice_level 27, a count of the clock cycles during which the bk_slice_high signal 48 and the bk_slice_low signal 49 are at logic low during each measuring period is computed. If the count during which the bk_slice_high signal 48 is at logic low is not less than the first reference count of 200 clock cycles, and if the count of the number of clock cycles during which the bk_slice_low signal 49 is at logic low is not less than the second reference count of 80 clock cycles, and is not greater than the first reference count of 200 clock cycles, then during that measuring period the bk_high_slice_level 26 and the bk_low_slice_level 27 are deemed to be at respective levels with the blanking level 107 of the video signal located within the first amplitude band width 31, see FIG. 7(c).

If the bk_high_slice_level 26 and the bk_low_slice_level 27 have been selected t define the first amplitude band width 31 of width less than the predetermined band width, the blanking level 107 is determined as being the value of the bk_high_slice_level 26, otherwise the blanking level 107 is determined as being the average of the values of the bk_high_slice_level 26 and the bk_low_slice_level 27.

In FIG. 7(a) the values of the bk_high_slice_level 26 and the bk_low_slice_have been selected as being too high, since the count of the clock cycles during which the bk_slice_high signal 48 and the bk_slice_low signal 49 are substantially similar, and both are greater than the first reference count of 200 clock cycles. In this case, the bk_high_slice_level 26 and bk_slice_low level 27 are decremented by one decrement, which in this embodiment of the invention is approximately 1% of the expected difference of the blanking level 107 and the sync tip level 110. If the number of clock cycles during which the bk_slice_low signal 49 is at logic low is greater than the first reference count, namely, 200 clock cycles, the bk_high_slice_level 26 and the bk_low_slice_level 27 are decremented by one decrement, and this continues during subsequent measuring periods, as will be described below with reference to FIG. 3, until the bk_high_slice_level 26 and the bk_low_slice_level 27 are at a level such that the blanking level 107 is within the bk_high_slice_level 26 and the bk_low_slice_level 27 as illustrated in FIG. 7(*c*).

Referring now to FIG. 7(*b*), the values of the bk_high_slice_level 26 and the bk_low_slice_level 27 have been selected as being too low. In this case, the count of clock cycles during the measuring period, during which the bk_slice_high signal 48 and the bk_slice_low signal 49 are at logic low both correspond approximately to the second reference count of 80 clock cycles, thus indicating that the bk_high_slice_level 26 and the bk_low_slice_level 27 require to be incremented. In this embodiment of the invention the value of each increment is similar to the value of each decrement, and is approximately 1% of the expected difference of the blanking level 107 and the sync tip level 110 of the video signal. If the count of clock cycles during which the bk_slice_high signal 48 is at logic low is less than the first reference count of 200 clock cycles, or if the number of clock cycles during which the bk_slice_low signal 49 is at logic low is less than the second reference count of 80 clock cycles, then the bk_high_slice_level 26 and the bk_low_slice_level 27 are incremented by one increment, and this continues during subsequent measuring periods, as will be described below with reference to FIG. 3, until the blanking level 107 of the video signal is determined as being located within the bk_high_slice_level 26 and the bk_low_slice_level 27.

Referring now to FIGS. 8(*a*) to (*c*), simultaneously while the values of the bk_high_slice_level 26 and the bk_low_slice_level 27 are being selected for tracking the blanking level 107 of the video signal, the sync tip level 110 of the horizontal sync signal 109 is also determined. The values of the third and fourth slice level signals 28 and 29 are selected so that the sync tip level 110 of the video signal lies within the third and fourth slice level signals 28 and 29. In FIGS. 8(*a*) to 8(*c*) the third slice level signal is identified as an sy_high_slice_level 28, and the fourth slice level signal 29 is identified as an sy_low_slice_level 29. The values of the sy_high_slice_level 28 and the sy_low_slice_level 29 are initially selected based on the clamped value of the video signal, which approximates to the sync tip level 110 so that the sync tip level 110 is within the sy_high_slice_level 28 and the sy_low_slice_level 29, or if not, the sy_high_slice_level 28 and the sy_low_slice_level 29 will be relatively close to the sync tip level 110 of the horizontal sync signal 109.

The sy_high_slice_level 28 and the sy_low_slice_level 29 define the second amplitude band width 32, and the relative values of the sy_high_slice_level 28 and the sy_low_slice_level 29 are selected so that the second amplitude band width 32 is similar to the first amplitude band width 31.

Once the values of the sy_high_slice_level 28 and the sy_low_slice_level 29 are initially selected, the determination of the level of the sync tip level 110 of the sync signal 109 is substantially similar to the determination of the blanking level 107 of the video signal which has already been described with reference to FIGS. 7(*a*) to 7(*c*). The sampled values of the video signal are compared on each clock cycle with the sy_high_slice_level 28 and the sy_low_slice_level 29, and respective third and fourth logic signals are generated, namely, an sy_slice_high logic signal 50 and an sy_slice_low logic signal 51. The sy_slice_high signal 50 is held at logic high for so long as the sampled values of the video signal are above the sy_high_slice_level 28, and the sy_slice_low_signal 51 is held at logic high for so long as the sampled values of the video signal are at or above the sy_low_slice_level 29. On the sampled values of the video signal being at or below the sy_high_slice_level 28, which correspond to third periods of the video signal, the sy_slice_high_signal 50 is set at logic low. On the sampled values of the video signal being below the sy_low_slice_level 29, which corresponds to fourth periods of the video signal, the sy_slice_low signal 51 is set at logic low.

A count of the number of clock cycles during which the sy_slice_high_signal 50 is at logic low during each measuring period is made, and a count of the number of clock cycles during which the sy_slice_low signal 51 is at logic low during each measuring period is also made. If the count of clock cycles during which the sy_slice_high signal 50 is at logic low is not greater than the first reference count of 200 clock cycles and is not less than the second reference count of 80 clock cycles, and if the count of clock cycles during which the sy_slice_low signal 51 is at logic low is not greater than the second reference count of 80 clock cycles, and is not less than a third reference count, which in this embodiment of the invention is 20 clock cycles, then the sy_high_slice_level 28 and the sy_low_slice_level 29 are deemed to be at a level where the sync tip level 110 of the sync signal 109 is within the second amplitude band width 32.

The selection of the third reference count at 20 clock cycles is a nominal figure to take into account the possibility of negative going noise spikes from the sync tip 110 of the horizontal sync signal 109, which may cross the sy_low_slice_level 29. Ideally, the sy_slice_low signal 51 would remain at logic low if there were no low going noise spikes from the sync tip 110 of the horizontal sync signal 109. The reference count of 20 clock cycles is selected on the basis that even with the noisiest video signal, the filtered video signal would not be below the sync tip 110 of the horizontal sync signal 109 for periods summing to greater than 20 clock cycles.

In FIG. 8(*c*) the sync tip level 110 of the horizontal sync signal 109 is illustrated within the sy_high_slice_level 28 and the sy_low_slice_level 29. If the second amplitude band width 32 is selected to be less than the predetermined band width, the sync tip level 110 is determined as being the value of the sy_high_slice_level 28, otherwise the sync tip level 110 is determined as the average of the sy_high_slice_level 28 and the sy_low_slice_level 29.

Figure 8C:
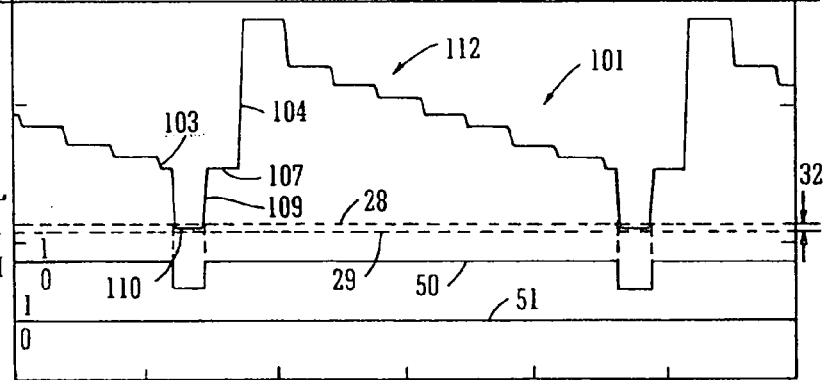

In FIG. 8(*a*) the sy_high_slice_level 28 and the sy_low_slice_level 29 are as having been set too high, while in FIG. 8(*b*) the sy_high_slice_level 28 and the sy_low_slice_level 29 are illustrated as having been set too low. Where the sy_high_slice_level 28 and the sy_low_slice_level 29 are set too high, the values of the sy_high_slice_level 28 and the sy_low_slice_level 29 are decremented by one decrement, and this continues during subsequent measuring periods, as will be described below with reference to FIG. 3, until the sync tip level 110 of the horizontal sync signal 109 is within the sy_high_slice_level 28 and the sy_low_slice_level 29.

Where the sy_high_slice_level 28 and the sy_low_slice_level 29 are set too low a illustrated in FIG. 8(*b*), the sy_high_slice_level 28 and the sy_low_slice_level 29 are incremented by one increment, and this continues during subsequent measuring periods, as will be described below with reference to FIG. 3, until the sync-tip level 110 of the horizontal sync signal 109 is within the sy_high_slice_level 28 and the sy_low_slice_level 29 as illustrated in FIG. 8(c). In this embodiment of the invention each incremental value is equal to each decremental value, and the incremental and decremental values are equal to the incremental and decremental values by which the bk_high_slice_level 26 and the bk_low_slice_level 27 are incremented and decremented, in other words, each increment and decrement is approximately 1% of the expected difference of the blanking level 107 and the sync tip level 110.

Referring now to FIG. 9, the intermediate slice level signal 30 is illustrated and is referred to as the int_slice_level 30. The intermediate slice level signal 30 is computed during each measuring period immediately the values of the bk_high_slice_level 26, the bk_low_slice_level 27, the sy_high_slice_level 28 and the sy_low_slice_level 29 have been selected. Where the first and second amplitude band widths 31 and 32 are selected to be of band width less than the predetermined band width, the value of the int_slice_level 30 is determined as being the average of the current values of the bk_high_slice_level 26 and the sy_high_slice_level 28, otherwise the value of the int_slice_level 30 is determined as being the average of the values of the bk_high_slice_level 26 and the bk_low_slice_level 27 and the average of the values of the sy_high_slice_level 28 and the sy_low_slice_level 29.

The synchronisation signal 35 is produced by comparing the sampled values of the video signal with the int_slice_level 30 on each clock cycle. While the value of the video signal is above the int_slice_level 30, the synchronisation signal 35 is set at logic high. On the value of the video signal transitioning in a negative direction across the int_slice_level 30, the synchronisation signal 35 is set at logic low, and is held at logic-low for so long as the value of the video signal remains below the value of the int_slice_level 30. On'the value of the video signal transitioning in a positive going direction across the int_slice_level 30, the synchronisation signal 35 is set at logic high, and is held at logic high for so long as the value of the video signal remains above the int_slice_level 30, thereby producing the synchronisation signal 35.

During successive measuring periods the accuracy of the synchronisation signal 35 increases until the positions of the bk_high_slice_level 26 and the bk_low_slice_level 27 are such that the blanking level 107 is within the two slice levels 26 and 27, and the positions of the sy_high_slice_level 28 and the sy_low_slice_level 29 are such that the sync tip level 110 is within the two slice levels 28 and 29.

Figure 3A:
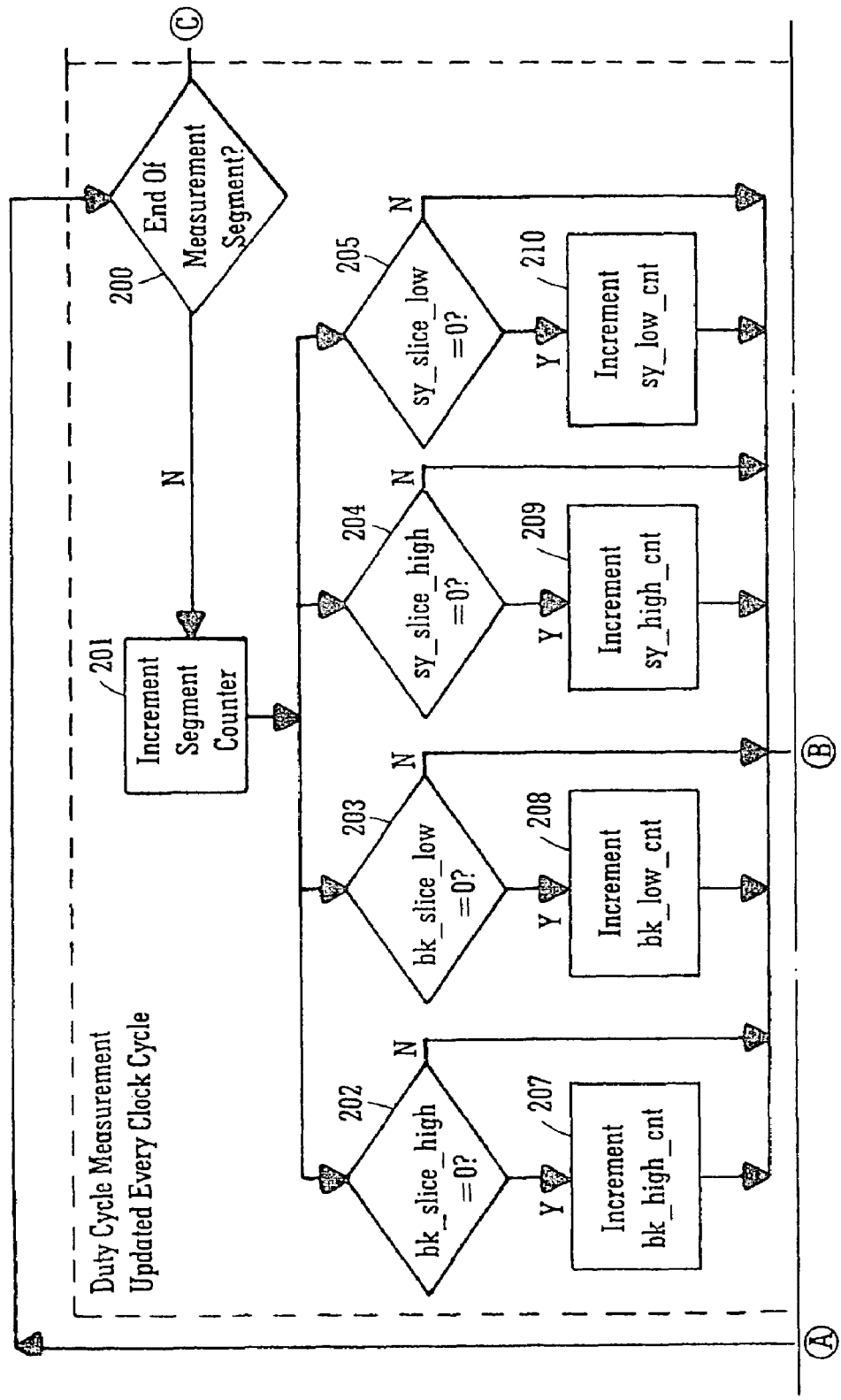
FIG. 3D illustrates a layout showing how the portions of the flowchart of FIGS. 3A to 3C are to be assembled.
Figure 3B:
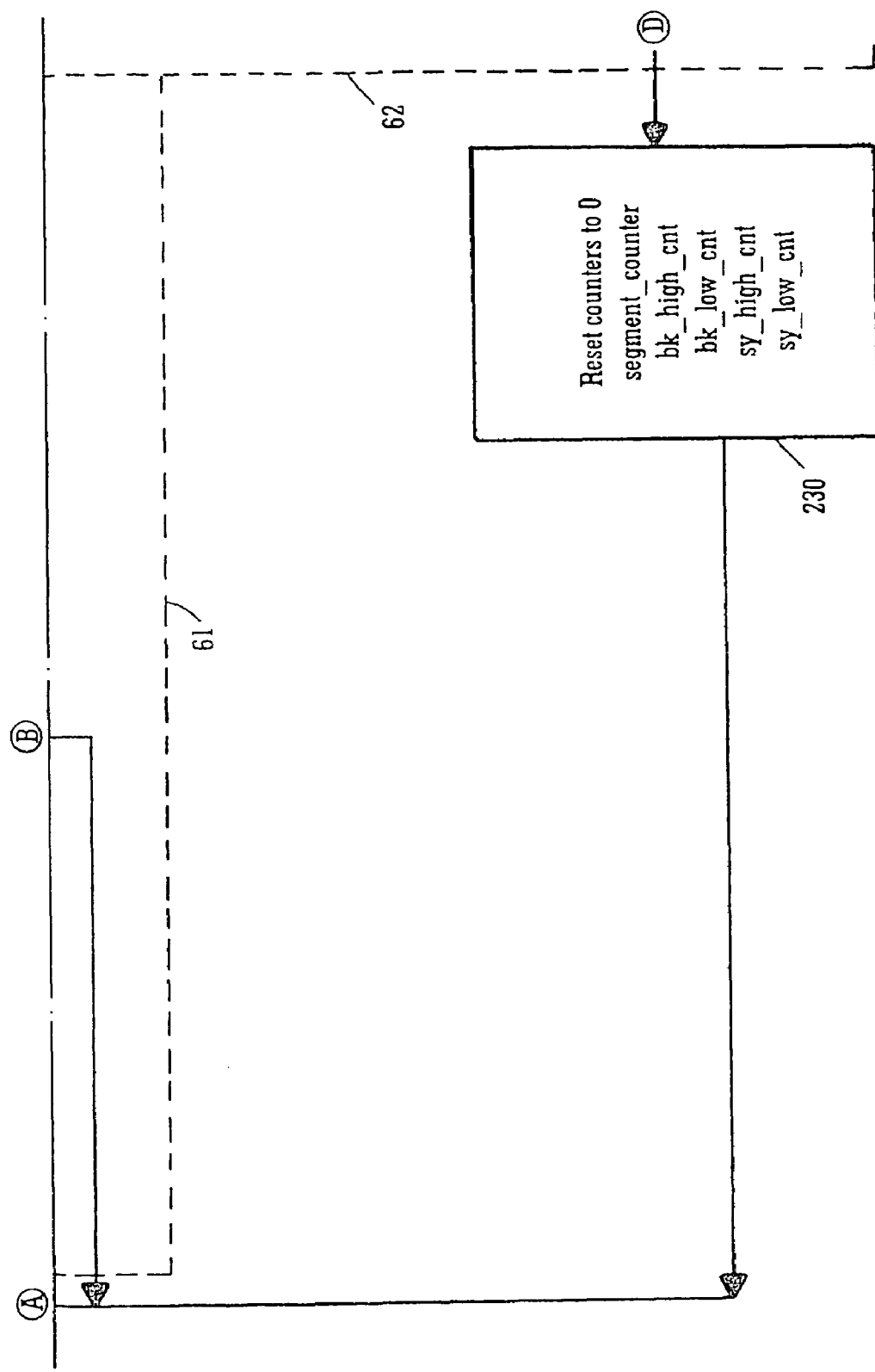
Figure 3C:
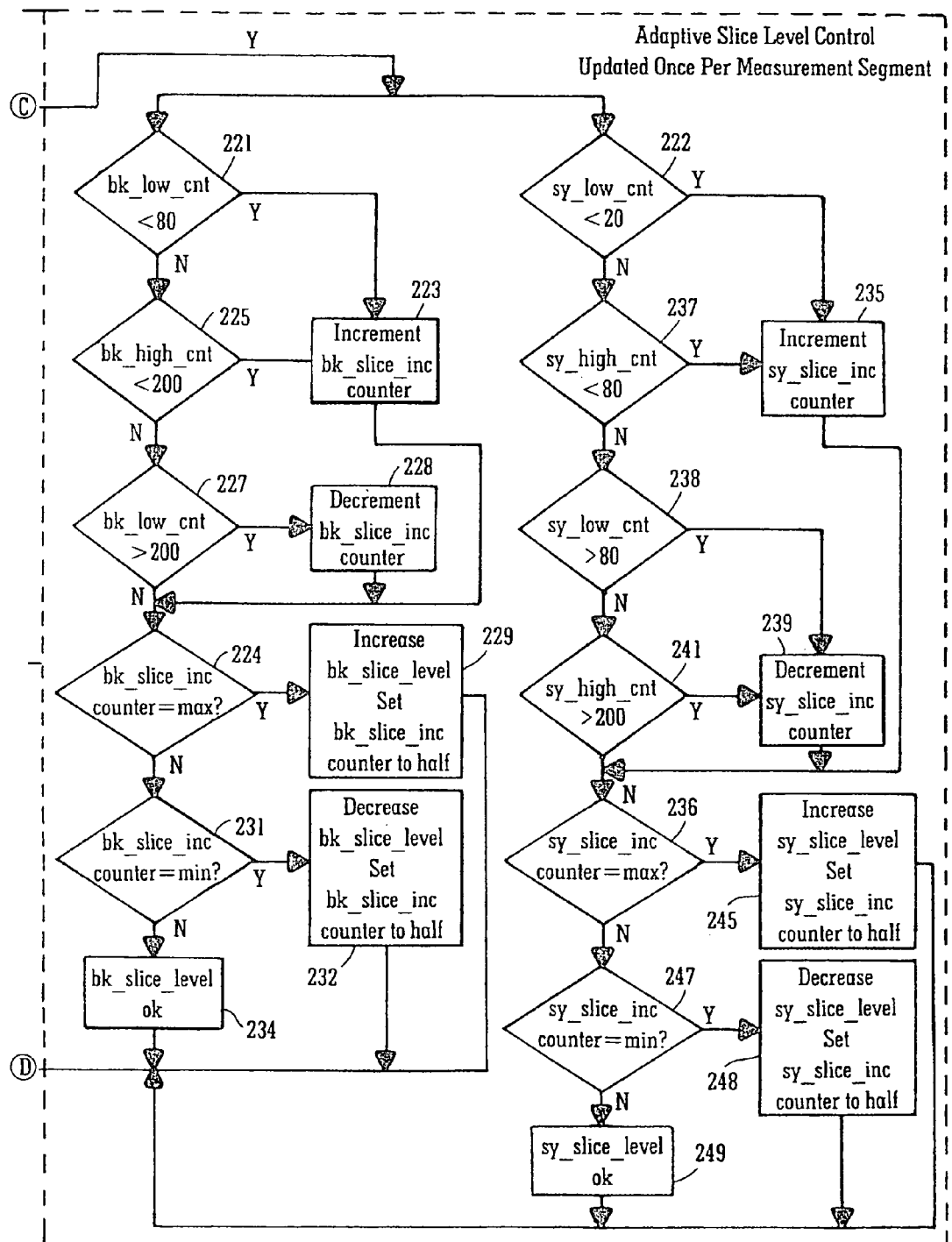

Referring now to FIG. 3, a flow chart of a routine carried out by the synchronisation signal generating circuit 22 in carrying out the method according to the invention for tracking the blanking level 107 and the sync tip level 110 of the video signal will now be described. Since the sampling rate of the video signal is 27 MHz, each measuring period of one line of the video signal corresponds to approximately 1,728 clock cycles. A clock cycle counter (not shown) for determining when a measuring period has been completed is set to count up to 1,728 clock cycles. The first reference time is set at the first reference count of 200 clock cycles. The second reference time is set at the second reference count of 80 clock cycles, and the third reference time is set at the nominal third reference count of 20 clock cycles, The routine of FIG. 3 is divided into two segments, namely, a duty cycle measuring segment 61 and a control segment 62.

The duty cycle measuring segment 61 measures the duty cycles of the bk_slice_high signal 48, the bk_slice_low signal 49, the sy_slice_high signal 50 and the sy_slice_low signal 51 as will be described below. The control segment 62 selects the appropriate value of the bk_high_slice level 26, the bk_low_slice level 27, the sy_high_slice level 28 and the sy_low_slice level 29 at the end of each measuring period as will be described below.

Block 200 starts the routine and reads the clock cycle counter (not shown) to ascertain if the previous sample of the video signal was the last sample of the current measuring period. If the previous sample was not the last sample, the routine moves to block 201 which increments the clock cycle counter by one, and moves the routine simultaneously to blocks 202, 203, 204 and 205. Block 202 reads the bk_slice_high signal 48, and if the bk_slice_high signal 48 is at logic low the routine moves to block 207 which increments a bk_high_count counter (not shown) by one. The bk_high_count counter is located in the analysing circuit 36 for counting the number of clock cycles the bk_slice_high signal 48 is at logic low in each measuring period. Block 203 reads the bk_slice_low signal 49, and if the bk_slice_low signal 49 is at logic low the routine moves to block 208 which increments a bk_low_count counter (not shown) by one. The bk_low_count counter is located in the analysing circuit 36 for counting the number of clock cycles the bk_slice_low signal 49 is at logic low in each measuring period.

Block 204 reads the sy_slice_high signal 50, and if the sy_slice_high signal 50 is at logic low the routine is moved to block 209, which increments an sy_high_count counter (not shown) by one. The sy_high_count counter is located in the analysing circuit 36 for counting the number of clock cycles by sy_slice_high signal 50 is at logic low during each measuring period. Block 205 reads the sy_slice_low signal 51, and if the sy_slice_low signal 51 is at logic low, the routine is moved to block 210 which increments an sy_low_count counter (not shown) by one, The sy_low_count counter is located in the analysing circuit 36 for counting the number of clock cycles the sy_slice_low signal 51 is at logic low. The steps of blocks 202, 203, 204 and 205 are simultaneously carried out, as are the steps of blocks 207, 208, 209 and 210, where appropriate, and on the completion of the steps carried out by blocks 207, 208, 209 and 210, or if any of blocks 202, 203, 204 and 205 determine that the bk_slice_high signal 48, the bk_slice_low signal 49, the sy_slice_high signal 50 and the sy_slice_low signal 51, respectively, are not at logic low, the routine is returned to block 200 for the next clock cycle. The bk_high_count, the bk_low_count, the sy_high_count and the sy_low_count counters may be implemented in hardware or software, and in this embodiment of the invention are implemented in hardware.

On block 200 determining that 1,728 consecutive samples of the video signal have been made in the current measuring period, block 200 determines that this measuring period has been completed and the routine moves simultaneously to blocks 221 and 222.

In order to avoid the bk_high_slice_level 26, the bk_low_slice level 27, the sy_high_slice_level 28, and the sy_low_slice_level 29 being incremented or decremented as a result of spurious signals, and to provide stability, two counters, namely, a bk_slice_increment counter, and an sy_slice_increment counter, neither of which are shown, are provided in the analysing circuit 36, and may be implemented in hardware or software. The bk_slice_increment counter and the sy_slice_increment counter count between respective maximum and minimum counts. Each time the control segment 62 of the flow chart of FIG. 3 determines that the bk_high_slice_level 26 and the bk_low_slice_level 27 are to be incremented or decremented, the count in the bk_slice_increment counter is either incremented or decremented by one. If the control segment 62 determines that the bk_high_slice_level 26 and the bk_low_slice_level 27 are to be incremented, the bk_slice_increment counter is incremented by one, and is decremented by one on the control segment 62 determining that the bk_high_slice level 26 and bk_low_slice_level 27 are to be decremented. The bk_high_slice_level signal 26 and the bk_low_slice_level 27 are only incremented when the bk_slice_increment counter reaches its maximum count, and the bk_high_slice_level 26 and the bk_low_slice_level 27 are only decremented when the count in the bk_slice_increment counter reaches its minimum count.

In this embodiment of the invention the bk_slice_increment counter counts to a maximum count of eight from a minimum count zero. Initially, the count in the bk_slice_increment counter is set at a midpoint count of four and on reaching its maximum count eight, the bk_high_slice_level 26 and the bk_low_slice_level 27 are incremented by one increment, and on the count in the bk_slice_increment counter reaching its minimum count of zero, the bk_high_slice_level 26 and the bk_low_slice_level 27 are decremented by one decrement. This effectively filters out spurious signals, and provides the bk_high_slice_level 26 and the bk_low_slice_level 27 with a type of hysteresis control.

The sy_slice_increment counter operates in similar fashion for providing the sy_high_slice_level 28 and the sy_low_slice_level 29 with a similar hysteresis type control, and counts between a minimum count of zero and a maximum count of eight.

Returning now to the flow chart of FIG. 3, block 221 reads the bk_low_count counter, which is operated under the control of block 208, and checks if the count in the bk_low_count counter is less than the second reference count of 80 clock cycles, which would indicate that the bk_low_slice_level 27 is set too low. If block 221 determines that the count in the bk_low_count counter is less than the second reference count of 80 clock cycles, the routine is moved to block 223. Block 223 increments the count in the bk_slice_increment counter by one and the routine moves to block 224, which is described below. If block 221 determines that the count in the bk_low_count counter is not less than the second reference count of 80 clock cycles, the routine moves to block 225.

Block 225 reads the count from the bk_high_count counter, which is operated under the control of block 207, and checks if the count in the bk_high_count counter is less than the first reference count of 200 clock cycles, which would Indicate that the bk_high_slice_level 26 has been set too low. If block 225 determines that the count in the bk_high_count counter is less than the first reference count of 200 clock cycles, the routine is moved to block 223, which has already been described. If block 225 determines that the count in the bk_high_count counter is not less than the first reference count of 200 clock cycles, the routine moves to block 227.

Block 227 reads the count in the bk_low_count counter, and checks if the count in the bk_low_count counter is greater than the first reference count of 200 clock cycles, which would indicate that the bk_low_slice_level 27 is set too high. If block 227 determines that the count in the bk_low_count counter is greater than the first reference count of 200 clock cycles, the routine moves to block 228, which decrements the count in the bk_slice_increment counter by one, and the routine moves to block 224, which will be described below. If block 227 determines that the count in the bk_low_count counter is not greater than the first reference count of 200 clock cycles, the routine moves to block 224.

Block 224 reads the count in the bk_slice_increment counter and checks if the count in the bk_slice_increment counter has reached its maximum count, namely, the count of eight. If so, the routine moves to block 229, which increments the bk_high_slice_level 26 and the bk_low_slice_level 27 by one increment and resets the bk_slice_increment counter to its midpoint count, namely, to the count of four, The routine then moves to block 230, which will be described below. If block 224 determines that the count in the bk_slice_increment counter has not reached its maximum count of eight, the routine moves to block 231, which checks if the count in the bk_slice_increment counter has reached its minimum count of zero. If so, the routine moves to block 232, which decrements the bk_high_slice_level 26 and the bk_low_slice_level 27 by one decrement, and resets the count in the bk_slice_increment counter to its midpoint count, namely, to the count of four. The routine then moves to block 230. If block 231 determines that the count in the bk_slice_increment counter has not reached its minimum count, the routine moves to block 234, which confirms that the bk_high_slice_level 26 and the bk_low_slice_level 27 are not to be altered, in other words, are not to be incremented or decremented. The routine then moves to block 230.

While the routine is progressing from block 221 to block 230 for setting the values of the bk_high_slice level 26 and the bk_low_slice_level 27, if appropriate, the routine is also simultaneously progressing from block 222 to block 230 for setting the values of the sy_high_slice_level 28 and the sy_low_slice_level 29. Block 222 reads the count in the sy_low_count counter, which is operated under the control of block 210, and checks if the count in the sy_low_count counter is less than the third reference count of 20 clock cycles, which would indicate that the sy_low_slice_level 29 is set too low. If block 222 determines that the count in the sy_low_count counter is less than the third reference count of 20 clock cycles, the routine moves to block 235. Block 235 increments the count in the sy_slice_increment counter by one, and the routine moves to block 236, which will be described below. If block 222 determines that the count in the sy_low_count counter is not less than the third reference count of 20 clock cycles, the routine moves to block 237.

Block 237 reads the count in the sy_high_count counter, which is operated under the control of block 209, and checks if the count in the sy_high_count counter is less than the second reference count of 80 clock cycles, which would indicate that the sy_high_slice level 28 is set too low. If block 237 determines that the count in the sy_high_count counter is less than the second reference count of 80 clock cycles, the routine is moved to block 235, which has already been described. If block 237 determines that the count in the sy_high_count counter is not less than the second reference count of 80 clock cycles, the routine is moved to block 238.

Block 238 reads the count in the sy_low_count counter, and checks if the count in the sy_low_count counter is greater than the second reference count of 80 clock cycles, which would indicate that the sy_low_slice_level 29 is set too high. If block 238 determines that the count in the sy_low_count counter is greater than the second reference count of 80 clock cycles, the routine moves to block 239, which decrements the count in the sy_slice_increment counter by one and moves the routine to block 236, which will be described below. If block 238 determines that the count in the sy_low_count counter is not greater than the second reference count of 80 clock cycles, the routine is moved to block 241.

Block 241 reads the count on the sy_high_count counter, and checks if the count in the sy_high_count counter is greater than the first reference count of 200 clock cycles, which would indicate that the sy_high_slice level 28 is set too high. If block 241 determines that the count in the sy_high_count counter is greater than 200, the routine moves to block 239, which has already been described. If block 241 determines that the count in the sy_high_count counter is not greater than the first reference count of 200 clock cycles, the routine is moved to block 236.

Block 236 reads the count in the sy_slice_increment counter, and checks if the count has reached its maximum count, which is also a count of eight. If so, the routine moves to block 245, which increments the sy_high_slice level 28 and the sy_low_slice_level 29 by one increment, and resets the sy_slice_increment counter to its midpoint count, which is four counts. The routine then moves to block 230, which will be described below. If block 236 determines that the count in the sy_slice_increment counter has not reached its maximum count, the routine moves to block 247, which checks if the count in the sy_slice_increment counter has reached its minimum count of zero. If so, the routine moves to block 248, which decrements the sy_high_slice_level 28 and the sy_low_slice_level 29 by one decrement, and resets the sy_slice_increment counter to its midpoint count of four. The routine then moves to block 230. If block 247 determines that the count in the sy_slice_increment counter has not reached its minimum count of zero, the routine moves to block 249. Block 249 confirms that the sy_high_slice_level 28 and the sy_low_slice level 29 are not to be altered on this clock cycle, in other words, are not to be incremented or decremented. The routine then moves to block 230.

Block 230 resets all the following counters to zero for the next clock cycle, namely, the bk_high_count counter, the bk_low_count counter, the sy_high_count counter and the sy_low_count counter, which are operated under the control of blocks 207, 208, 209 and 210, respectively, and the routine is then returned from block 230 to block 200, which has already been described, for the next clock cycle and so operation of the method continues, and the next measuring period commences. However, the count in the bk_slice_increment counter and the count in the sy_slice_increment counter are retained from one measuring period to the next measuring period in order to provide the bk_high_slice_level 26, the bk_low_slice_level 27, the sy_high_slice_level 28 and the sy_low_slice_level 29 with the hysteresis type of movement for filtering out spurious signals or the absence of a horizontal sync pulse in one or a few consecutive lines of video data of the video signal.

Figure 4:
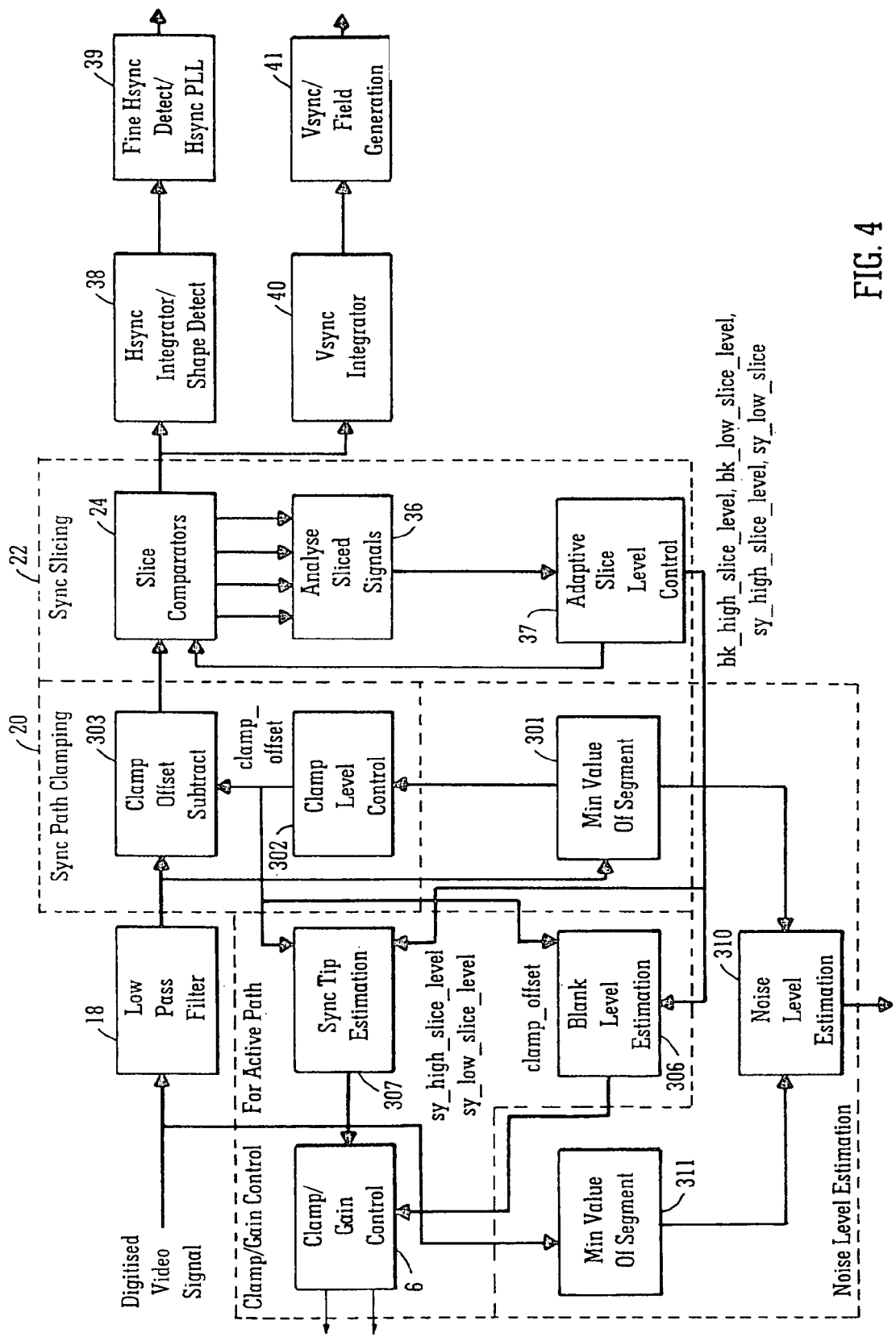
FIG. 4 is a more detailed block representation of the synchronisation signal generating circuit of FIG. 2.

Referring now to FIG. 4, the clamping of the filtered digitised video signal will now be described with reference to the system diagram of the synchronisation signal recovery circuit 3. The digitised video signal is applied to the low pass digital filter 18, and the filtered digitised video signal from the low pass digital filter 18 is applied to the sync tip clamp stage 20. The sync tip clamp stage 20 comprises a first minimum value determining stage 301 which determines the short-term minimum value of the filtered digitised video signal, which should correspond to the sync tip level 110 of the horizontal sync signal 109 of the video signal. A clamp level control stage 302 filters the short-term minimum value determined by the first minimum value determining stage 301 over an appropriate number of measuring periods, which may be from two upwards in order to determine a clamp offset value, in other words, in order to determine the code corresponding to the sync tip level 110 of the horizontal sync signal 109 of the video signal. A clamp offset stage 303 subtracts the clamp offset value from each sample of the video signal for clamping the video signal at approximately code zero. This provides coarse clamping of the digitised video signal.

A clamp and gain control segment 305 for operating the clamp and gain control circuit 6, for in turn controlling the clamp and gain stage 5 is responsive to the clamp offset value from the clamp level control stage 302, and the first, second, third and fourth slice level signals 26, 27, 28 and 29, respectively, for providing an estimation of the blanking level 107 and the sync tip level 110 of the analogue form of the video signal to the clamp and gain control circuit 6. A blanking level estimating stage 306 in response to the current values of the first, second, third and fourth slice level signals 26, 27, 28 and 29 from the slice level control circuit 37 and the current clamp offset value from the clamp level control stage 302 estimates the current value of the blanking level 107 of the video signal of the analogue form of the video signal. The blanking level estimating stage 306 computes the estimated current value of the blanking level 107 by adding the current clamp offset value to the average of the current values of the first and second slice level signals 26 and 27, and subtracting the average of the third and fourth slice level signals from the sum of the current clamp offset value and the average of the current values of the first and second slice level signals 26 and 27. A sync tip estimating stage 307 is responsive to the current values of the third and fourth slice level signals 28 and 29 from the slice level control circuit 37 and the current clamp offset value from the clamp level control stage 302 for estimating the current value of the sync tip level 110 of the horizontal sync signal 109 of the analogue form of the video signal. The sync tip estimating stage computes the estimated current value by adding the current clamp offset value and the average of the current values of the third and fourth slice level signals 28 and 29. The blank level estimating stage 306 and the sync tip level estimating stage 307 output the respective estimated current values of the blanking level 107 and the sync tip level 110 to the digital clamp and gain control circuit 6 for in turn controlling the analogue clamp and gain stage 5.

A noise level estimating stage 310 compares the short-term minimum values of the digitised video signal prior to being filtered by the low pass filter 18 with corresponding short-term minimum values of the filtered digitised signal from the minimum value determining stage 301 for determining the noise level of the digitised video signal prior to being filtered. A second minimum value determining stage 311 determines the short-term minimum value of the unfiltered digitised video signal for comparison with the short-term minimum value of the filtered digitised video signal by the noise level estimating stage 310. The noise level determined by the noise level estimating stage 310 is subsequently filtered and used for selecting the appropriate first and second amplitude band widths 30 and 31 which are defined by the first and second slice level signals 26 and 27, and the third and fourth slice level signals 28 and 29, respectively.

Figure 10A:
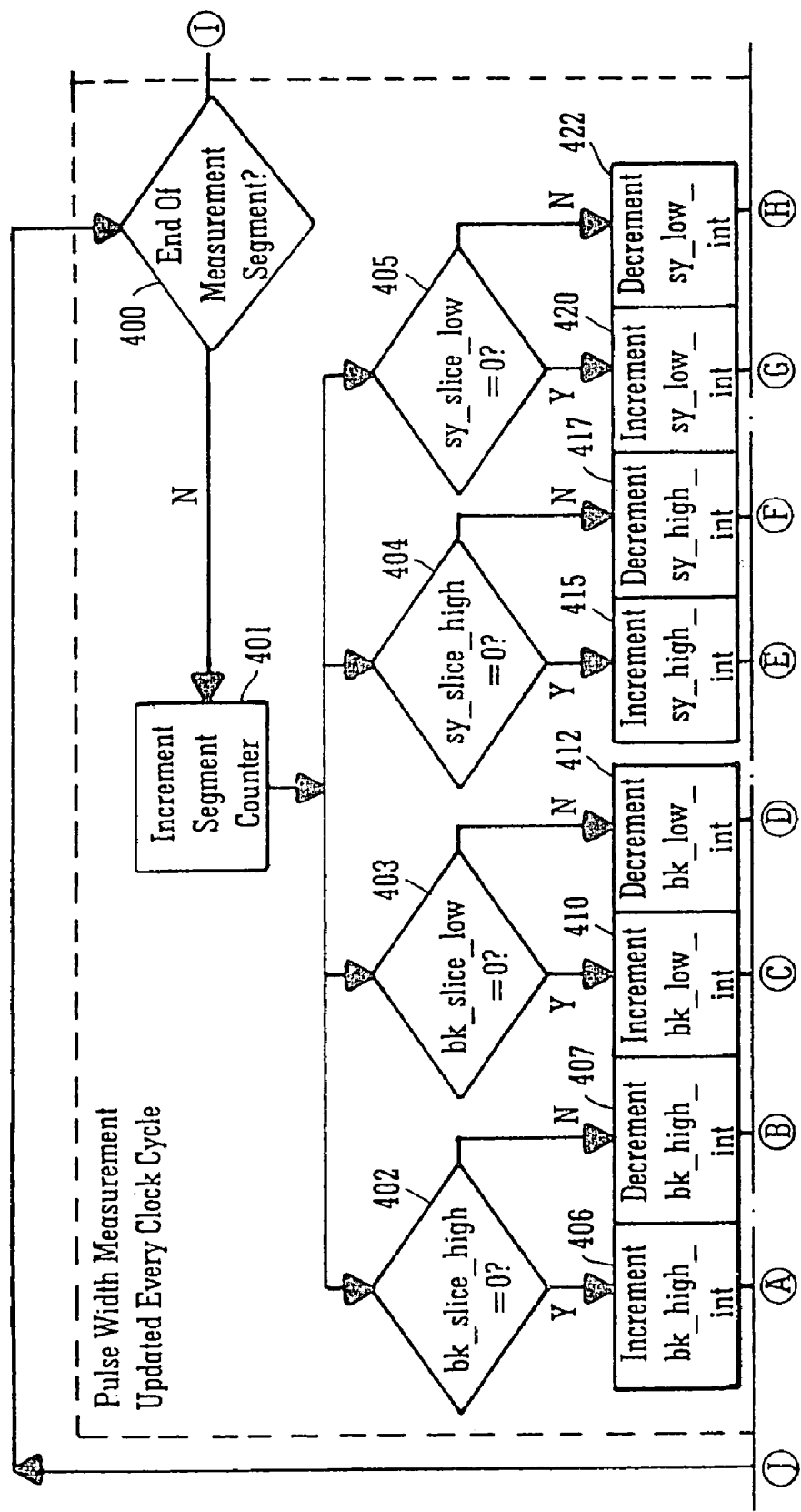
FIGS. 10A to 10C are portions of a flowchart illustrating the method steps carried out by a method according to another embodiment of the invention for deriving the synchronization signal from the video signal.
Figure 10B:
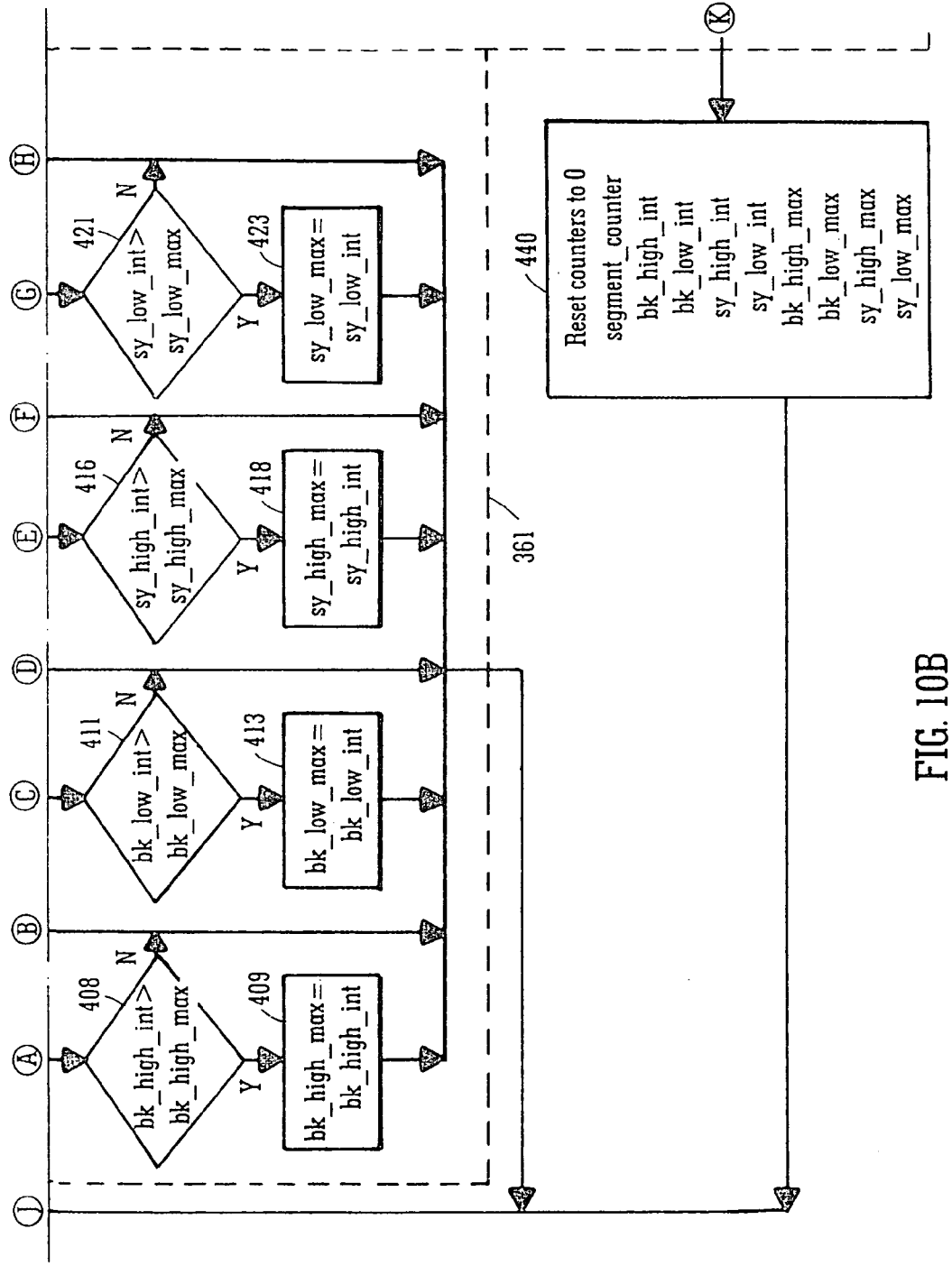
Figure 10C:
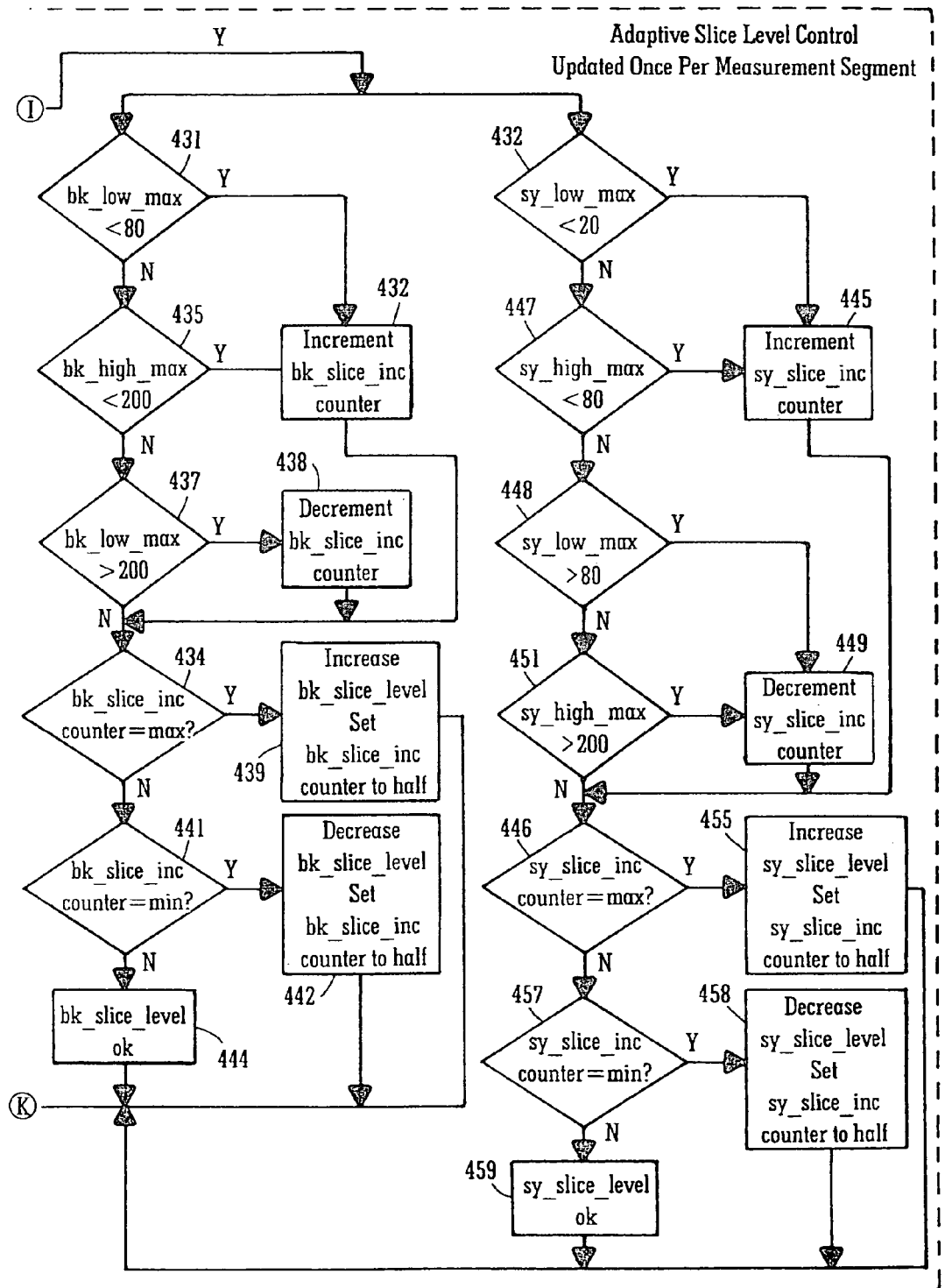

Referring now to FIG. 10, there is illustrated a flow chart of a routine of an alternative method under which the synchronisation signal generating circuit 22 operates for tracking the blanking level 107 and the sync tip level 110 of the horizontal sync signal 109 of the video signal. The flow chart of FIG. 10 comprises a duty cycle measuring segment 361, and a control segment 362. In this embodiment of the invention instead of the duty cycle measuring segment 361 counting the number of clock cycles in a measuring period during which the video signal is below the bk_high_slice_level 26, the bk_low_slice_level 27, the sy_high_slice_level 28 and the sy_low_slice_level 29, the duty cycle measuring segment 361 of the routine of the flow chart of FIG. 10 determines the length of the period during which the video signal is below the slice levels 26 to 29 during consecutive clock cycles.

Accordingly, in the method according to this embodiment of the invention the bk_slice_high signal 48, the bk_slice_low signal 49, the sy_slice_high signal 50 and the sy_slice_low signal 51 are integrated for determining the length of the period during which the video signal is continuously below the bk_high_slice level 26, the bk_low_slice_level 27, the sy_high_slice_level 28 and the sy_low_slice_level 29. By determining the length of the period during which the video signal is continuously below the slice levels 26 to 29, a more accurate determination of location of the horizontal sync pulse in the video signal may be made, and additionally, spurious results are avoided, which would otherwise arise in the event of a poor or noisy video signal, if one or a few consecutive values of the bk_slice_high signal 48, the bk_slice_low signal 49, the sy_slice_high signal 50 or the sy_slice_low signal 51 were at logic high during a horizontal sync signal of the video signal. By integrating the signals 48, 49, 50 and 51, such values are filtered out, thereby avoiding spurious results. Accordingly, in this embodiment of the invention the synchronisation signal generating circuit 22 is provided with four integrators which integrate the bk_slice_high signal 48, the bk_slice_low signal 49, the sy_slice_high signal 50 and the sy_slice_low signal 51 during each measuring period. Each integrator is provided by an up/down counter as will now be described with reference to the duty cycle measuring segment 361 of the flow chart of FIG. 10. The up/down counters may be provided in hardware or software, and are referred to as a bk_high_int up/down counter for integrating the bk_slice_high signal 48, a bk_low_int up/down counter for integrating the bk_slice_low signal 49, an sy_high_int up/down counter for integrating the sy_slice_high signal 50, and an sy_low_int up/down counter for integrating the sy_slice_low signal 51.

Block 400 of the flow chart of FIG. 10 is similar to block 200 of the flow chart of FIG. 3, and checks if the previous sample of the video signal was the last sample for the current measuring period. If the previous sample was not the last sample, the routine moves to block 401, which is similar to block 201 of the flow chart of FIG. 3, and block 401 increments the clock cycle counter by one, and moves the routine simultaneously to blocks 402, 403, 404 and 405. Blocks 402, 403, 404 and 405 are similar to blocks 202, 203, 204 and 205, respectively, of the flow chart of FIG. 3. Block 402 reads the bk_slice_high signal and checks if it is at logic low. If so, the routine moves to block 406, which increments the bk_high_int up/down counter by one for integrating the bk_slice_high signal 48, and the routine moves to block 408, which will be described below. If block 402 determines that the bk_slice_high signal 48 is not at logic low, the routine moves to block 407. Block 407 decrements the bk_high_int up/down counter by one, likewise for integrating the bk_slice_high signal 48, and the routine is returned to block 400 for the next clock cycle.

In order to determine the width of the widest portion of the bk_slice_high signal 48 during which the bk_slice_high signal 48 is at logic low, and in order to filter out spurious spikes when the bk_slice_high signal 48 is at logic high, the previous maximum count of the bk_high_int up/down counter during the current measuring period is stored, and after the count in the bk_high_int up/down counter has been incremented in the current clock cycle, the current count in the bk_high_int up/down counter is compared with the stored previous maximum count. If the current count in the bk_high_int counter is greater than the stored previous maximum count the current count in the bk_high_int up/down counter is stored as the previous maximum count, otherwise the previous maximum count is left unaltered.

Accordingly, block 408 checks if the current count in the bk_high_int up/down counter is greater than the stored previous maximum count of the bk_high_int up/down counter during the current measuring period, and if so, the routine moves to block 409, which stores the current count of the bk_high_int up/down counter as the previous maximum count of the bk_high_int up/down counter. The routine is then returned to block 400 for the next clock cycle. Should block 408 determine that the count in the bk_high_int up/down counter is not greater than the stored previous count of the bk_high_int up/down counter, the routine is returned to block 400 for the next clock cycle.

Block 403 reads the bk_slice_low signal 49 and checks if it is at logic low, and if so, the routine moves to block 410, which increments a bk_low_int up/down counter by one for integrating the bk_slice_low signal 49, and the routine moves t block 411. If block 403 determines that the bk_slice_low signal 49 is not at logic low, the routine moves to block 412, which decrements the bk_low_int up/down counter by one and returns the routine to block 400 for the next cock cycle. The operation of blocks 410 and 412 for integrating the bk_slice_low signal 49 is similar to that of blocks 406 and 407 for integrating the bk_slice_high signal 48, Block 411, which checks if the count in the bk_low_int up/down counter is greater than a stored previous maximum count of the bk_low_int counter during the current measuring period, and if block 411 determines that the count in the bk_low_int up/down counter is greater than the stored previous maximum count of the bk_low_int up/down counter, the routine moves to block 413. Block 413 stores the current count in the bk_low_int up/down counter as the previous maximum count of the bk_low_int up/down counter, and the routine is returned to block 400 for the next clock cycle. If block 411 determines that the count in the bk_low_int up/down counter is not greater than the stored previous maximum count of bk_low_int up/down counter, the routine is returned to block 400 for the next clock cycle. The operation of blocks 411 and 413 in connection with the integration of the bk_slice_low signal 49 is similar to the operation of blocks 408 and 409 in connection with the integration of the bk_slice_high signal 48.

Block 404 checks if the sy_slice_high signal 50 is at logic low, and if so, the routine moves to block 415. Block 415 increments the count in the sy_high_int up/down counter by one for integrating the sy_slice_high signal 50, in similar fashion as the bk_high_int up/down counter integrates the bk_slice_high signal 48. The routine then moves to block 416. If block 404 determines that the sy_slice_high signal 50 is not at logic low, the routine moves to block 417, which decrements the count in the sy_high_int up/down counter similarly for integrating the sy_slice_high signal 50. After bock 417 the routine is returned to block 400 for the next clock cycle.

Block 416 checks if the current count in the sy_high_int up/down counter is greater than a stored previous maximum count of the sy_high_int up/down counter during the current measuring period. If so, the routine moves to block 418, which stores the current count of the sy_high_int up/down counter as the previous maximum count of sy_high_int up/down counter, and the routine is returned to block 400 for the next clock cycle. The operation of blocks 416 and 418 in the integration of the sy_slice_high signal 50 is similar to blocks 408 and 409 in the integration of the bk_slice_high signal 48.

Block 405 checks if the sy_slice_low signal 51 is at logic low, and if so, the routine moves to block 420. Block 420 increments the sy_low_int up/down counter by one for integrating the sy_slice_low signal 51, and the routine moves to block 421. If block 405 determines that the sy_slice_low signal 51 is not at logic low, the routine moves to block 422, which decrements the count in the sy_low_int up/down counter by one, for similarly integrating the sy_slice_low signal 51, and the routine is returned to block 400 for the next clock cycle.

Block 421 checks if the current count in the sy_low_int up/down counter is greater than a stored previous maximum count of the sy_low_int up/down counter during the current measuring period, and if so, the routine moves to block 423. Block 423 stores the current count in the sy_low_int up/down counter as the previous maximum count of the sy_low_int up/down counter, and the routine is returned to block 400 for the next clock cycle. The operation of blocks 420, 421, 422 and 423 in the integration of the sy_slice_low signal 51 is similar to the operation of blocks 406, 407, 408 and 409 in the integration of the bk_slice_high signal 48.

On block 400 determining that 1,728 consecutive samples of the video signal have been made in the current measuring period, the routine is moved simultaneously to blocks 431 and 432. At this stage the stored previous maximum counts stored for the bk_high_int, the bk_low_int, the sy_high_int and the sy_low_int up/down counters will be the maximum counts which the respective four up/down counters will have reached in the current measuring period, and for convenience will be referred to as the bk_high_max count, the bk_low_max count, the sy_high_max count and the sy_low_max count, respectively. Block 431 is somewhat similar to block 221 of the flow chart of FIG. 3, however, in this case block 431 checks if the stored bk_low_max count stored during the current measuring period by block 413 is less than the second reference count of 80 clock cycles. If so, the routine moves to block 432, which is similar to block 223 of the flow chart of FIG. 3, and increments the bk_slice_increment counter by one count. The routine then moves to block 434, which is similar to block 224 of the routine of FIG. 3, and will be briefly described below. If block 431 determines that the bk_low_max count is not less than the second reference count of 80 clock cycles, the routine moves to block 435, which checks if the bk_high_max count stored by block 409 during the current measuring period is less than the first reference count of 200 clock cycles. If so, the routine moves to block 432, which has already been described, otherwise, the routine moves to block 437. Block 437 checks if the bk_low_max count stored by block 413 is greater than the first reference count of 200 clock cycles, and if so, the routine moves to block 438. Block 438 is similar to block 228 of the flow chart of FIG. 3, and decrements the bk_slice_increment counter by one count. The routine then moves to block 434.

Block 434, as mentioned above, is similar to block 224, and checks if the bk_slice_increment counter has reached its maximum count. If so, the routine moves to block 439, which is similar to block 229 of the flow chart of FIG. 3, and increases the bk_high_slice_level 28 and the bk_low_slice_level 29 by one increment. Block 439 also resets the bk_slice_increment counter to its midpoint count, namely, the count of four, and moves the flow chart to block 440, which is described below. If block 434 determines that the count in the bk_slice_increment counter has not reached its maximum count, the routine moves to block 441, which checks if the count in the bk_slice_increment counter has reached its minimum count. If so, the routine moves to block 442, which decrements the bk_high_slice_level 28 and the bk_low_slice_level 29 by one decrement, and resets the bk_slice_increment counter to its midpoint count of four, and the routine then moves to block 440. If block 441 determines that the count in the bk_slice_increment counter has not reached its minimum count, the routine moves to block 444, which confirms that the bk_high_slice_level 28 and the bk_low_slice_level 29 are to remain unaltered, and the routine moves to block 440.

Returning now to block 432, block 432 is somewhat similar to block 222 of the flow chart of FIG. 3, however, in this case block 432 checks if the sy_low_max count stored by block 423 during the current measuring period is less than the third reference count of 20 clock cycles. If so, the routine moves to block 445, which is similar to block 435 of the flow chart of FIG. 3, and increments the sy_slice_increment counter by one, and moves the routine to block 446, which will be described below. If, on the other hand, block 432 determines that the sy_low_max count is not less than the third reference count of 20 clock cycles, the routine moves to block 447, which checks if the sy_high_max count stored by block 416 during the current measuring period is less than the second reference count of 80 clock cycles. If so, the routine moves to block 445, which has already been described. If block 447 determines that the sy_high_max count is not less than the second reference count of 80 clock cycles, the routine moves to block 448, which checks if the sy_low_max count is greater than the second reference count of 80 clock cycles, and if so, the routine moves to block 449. Block 449 is similar to block 239 of the flow chart of FIG. 3, and decrements the sy_slice_increment counter by one and moves the routine to block 446. If block 448 determines that the sy_low_max count is not greater than the second reference count of 80 clock cycles, the routine moves to block 451, which checks if the sy_high_max count is greater than the first reference count of 200 clock cycles. If so, the routine moves to block 449, which has already been described.

Returning now to block 446, block 446 is substantially similar to block 236 of the flow chart of FIG. 3, and checks if the count in the sy_slice_increment counter has reached its maximum count. If so, the routine moves to block 455, which is similar to block 245 of the flow chart of FIG. 3, and increments the sy_high_slice_level 28 and the sy_low_slice_level 29 by one increment. Block 455 also resets the count in the sy_slice_increment counter to its midpoint count of four, and the routine moves to block 440.

If block 446 determines that the count in the sy_slice_increment counter has not reached its maximum count, the routine moves to block 457, which checks if the count in the sy_slice_increment counter has reached its minimum count. If so, the routine moves to block 458, which is similar to block 248 of the flow chart of FIG. 3, and decrements the sy_high_slice_level 28 and the sy_low_slice_level 29 by one decrement, and resets the count in the sy_slice_increment counter to its midpoint count of four. The routine then moves to block 440. If block 457 determines that the count in the sy_slice_increment counter has not reached its minimum count, the routine moves to block 459, which confirms that the sy_high_slice_level 28 and the sy_low_slice_level 29 are to remain unaltered, and the routine moves to block 440.

Block 440 resets the following counters to zero, namely, the bk_high_int up/down counter, the bk_low_int up/down counter, the sy_high_int up/down counter and the sy_low_int up/down counter. Additionally, block 440 clears the stored bk_high_max count, the bk_low_max count, the sy_high_max count and the sy_low_max count to zero. After block 440 has completed its tasks, the routine is returned to block 400 for the next clock cycle and the next measuring period.

After the values of the bk_high_slice_level 26, the bk_low_slice_level 27, the sy_high_slice_level 28 and the sy_low_slice_level 29 have been set, the value of the intermediate slice level signal, namely, the int_slice_level 30 is computed based on the values of the bk_high_slice_level 26, the bk_low_slice_level 27, the sy_high_slice_level 28 and the sy_low_slice_level 29 as already described with reference to FIGS. 1 to 9.

While the sampling rate at which the video signal is sampled has been described as being a sampling rate of 27 MHz, any other suitable sampling rate may be used. Needless to say, while the first, second and third reference counts have been described as being of specific values, other suitable values of first, second and third reference counts may be used, and where a sampling rate other than 27 MHz is used, the first, second and third reference counts will be correspondingly altered.

While the method according to the invention has been described as requiring the selection of third and fourth slice level signals for tracking the sync tip level, it will be appreciated that once the video signal has been clamped with the sync tip level clamped at a reference code, typically, code zero, the method according to the invention could be executed without the need for providing third and fourth slice level signals for tracking the sync tip level. In which case the value of the intermediate slice level signal would be computed from the current values of the first or the first and second slice level signals and the reference code at which the video signal is clamped. However, the provision of the third and fourth slice level signals permits more accurate tracking of the sync tip level of the horizontal sync signal, thereby facilitating ongoing clamping of the video signal, and also facilitating a more accurate selection of the value of the intermediate slice level signal.

While the bk_slice_increment counter and the sy_slice_increment counter both have been described as counting up to a maximum count of eight, and counting down to a minimum count of zero, the bk_slice_increment counter and the sy_slice_increment counter may count between any desired predetermined range of counts. The greater the number of counts between which the bk_slice_increment counter and the sy_slice_increment counter counts, the more stable will be the method for selecting the first, second, third and fourth slice level signals, however, the slower will be the method to react to changes in the video signal.

While the first and second amplitude band widths have been described as being selected in response to noise in the signal, it is envisaged in certain cases, that the first and second amplitude band widths may be of predetermined width, which would be constant.

While the intermediate slice level signal has been described as being computed to lie halfway between the blanking level and the sync tip level of the synchronisation pulse signal of the video signal, the intermediate slice level signal may be computed to lie at any desired position between the blanking level and the sync tip level of the video signal.

The invention claimed is:

1. A method for deriving a synchronisation signal from a video signal having a synchronisation pulse signal therein, the method comprising the steps of:

selecting a value of at least one of a first slice level signal and a second slice level signal, the at least one of the first and second slice level signals being of selectable value, and the first and second slice level signals defining a first amplitude bandwidth therebetween, the selected value of the at least one of the first and second slice level signals being such that the second slice level signal lies on the side of the first slice level signal in a direction similar to that from which the synchronisation pulse signal is expected to extend from the blanking level of the video signal, and the value of the blanking level of the video signal lies within the respective values of the first and second slice level signals, deriving a value of an intermediate slice level signal from the current value of at least one of the first and second slice level signals and the current value of a signal indicative of the value of the sync tip of the synchronisation pulse signal of the video signal, so that the value of the intermediate slice level signal lies intermediate the current value of the at least one of the first and second slice level signals and the current value of the signal indicative of the value of the sync tip of the synchronisation pulse signal of the video signal, comparing the video signal with the intermediate slice level signal, and producing the synchronisation signal by providing a logic signal at one of a logic high level and a logic low level and transitioning the logic signal from the one of the logic high level and the logic low level to the other of the logic high level and the logic low level in response to the value of the video signal transitioning in at least one direction across the value of the intermediate slice level signal.

2. A method as claimed in claim 1 in which the value of the video signal is compared with the current value of the first slice level signal for determining first periods of the video signal during which the value of the video signal lies to the side of the current value of the first slice level signal as that to which the current value of the second slice level signal lies during a measuring period of predetermined length, and the value of the video signal is compared with the current value of the second slice level signal for determining second periods of the video signal during which the value of the video signal lies to the side of the current value of the second slice level signal opposite to that to which the current value of the first slice level signal lies during the measuring period, the first periods being compared with a first reference period and the second periods being compared with a second reference period for determining if the blanking level of the video signal lies within the current values of the first and second slice level signals, the second reference period being less than the first reference period.

3. A method as claimed in claim 2 in which the second periods are compared with the first reference period for determining if the blanking level of the video signal lies within the current values of the first and second slice level signals.

4. A method as claimed in claim 2 in which the video signal is sampled at a predetermined sampling rate during the measuring period for determining the first and second periods.

5. A method as claimed in claim 4 in which the first periods are summed prior to being compared with the first reference period, and the second periods are summed prior to being compared with the second reference period.

6. A method as claimed in claim 5 in which the sum of the first periods is determined by counting the number of samples of the video signal the values of which correspond to the first periods, and the sum of the second periods is determined by counting the number of samples of the video signal the values of which correspond to the second periods.

7. A method as claimed in claim 2 in which a first logic signal is derived from the comparison of the value of the video signal with the first slice level signal, the first logic signal being set at one of a logic high level and a logic low level during the first periods of the video signal, and at the other of the logic high level and logic low level when the value of the video signal does not correspond to the first periods, and a second logic signal is derived from the comparison of the value of the video signal with the second slice level signal, the second logic signal being set at one of a logic high level and a logic low level during the second periods of the video signal, and at the other of the logic high level and logic low level when the value of the video signal does not correspond to the second periods, the first and second logic signals being integrated during the measuring period, and one of the maximum and minimum values of the integrated signal of the first logic signal being compared with the first reference period, and one of the maximum and minimum values of the integrated signal of the second logic signal being compared with the second reference period for determining if the blanking level of the video signal lies within the current values of the first and second slice level signals.

8. A method as claimed in claim 2 in which the first reference period corresponds to a period not greater than a period representative of the duration of the number of blanking periods which the video signal should contain during the measuring period.

9. A method as claimed in claim 2 in which the first reference period corresponds to a period greater than a period representative of the duration of the number of synchronisation pulse signals which the video signal should contain during the measuring period.

10. A method as claimed in claim 2 in which the measuring period corresponds to one line of video data of the video signal, and the duration of the first reference period is less than 9 microseconds.

11. A method as claimed in claim 10 in which the duration of the first reference period is approximately 7.5 microseconds.

12. A method as claimed in claim 2 in which the second reference period corresponds to a period not greater than a period representative of the duration of the number of synchronisation pulse signals which the video signal should contain during the measuring period.

13. A method as claimed in claim 2 in which the measuring period corresponds to one line of video data of the video signal, and the duration of the second reference period is not greater than 4.7 microseconds.

14. A method as claimed in claim 13 in which the duration of the second reference period is approximately 3 microseconds.

15. A method as claimed in claim 2 in which the value of the at least one of the first and second slice level signals selected in a previous measuring period is altered in response to the comparison of the first and second periods with the first and second reference periods, respectively, in at least two subsequent measuring periods indicating that the value of the at least one of the first and second slice level signals should be selected for moving the first and second slice level signals consecutively in the same direction in each of the at least two subsequent measuring periods.

16. A method as claimed in claim 15 in which the values of the first and second slice level signals are incremented by a first predetermined increment if the synchronisation pulse signal of the video signal is a negative going pulse, and the sum of the first periods in the measuring period is less than the first reference period, or the sum of the second periods in the measuring period is less than the second reference period.

17. A method as claimed in claim 16 in which the values of the first and second slice level signals are decremented by a first predetermined decrement if the synchronisation pulse signal of the video signal is a negative going pulse, and the sum of the second periods in the measuring period is greater than the first reference period.

18. A method as claimed in claim 15 in which each first predetermined decrement is of value similar to each first predetermined increment.

19. A method as claimed in claim 1 in which the value of the at least one of the first and second slice level signals is initially selected so that the values of the first and second slice level signals lie between the expected values of the blanking level and the sync tip of the synchronisation pulse signal of the video signal.

20. A method as claimed in claim 1 in which the value of the intermediate slice level signal is derived from the current value of the first slice level signal when the first amplitude band width does not exceed a first predetermined proportion of the expected difference between the expected values of the blanking level and the sync tip of the synchronisation pulse signal of the video signal.

21. A method as claimed in claim 20 in which the value of the intermediate slice level signal is derived from the average of the current values of the first and second slice level signals when the first amplitude band width exceeds the first predetermined proportion of the difference between the expected values of the blanking level and the sync tip of the synchronisation pulse signal of the video signal.

22. A method as claimed in claim 1 in which the width of the first amplitude band width is selected in response to noise in the video signal.

23. A method as claimed in claim 1 in which the value of the first slice level signal is selectable, and the value of the second slice level signal is dependent on the selected value of the first slice level signal.

24. A method as claimed in claim 2 in which the method further comprises selecting a value of at least one of a third slice level signal and a fourth slice level signal, the at least one of the third and fourth slice level signals being of selectable value, and the third and fourth slice level signals defining a second amplitude band width therebetween, the value of the at least one of the third and fourth slice level signals being selected so that the value of the sync tip of the synchronisation pulse signal of the video signal lies between the values of the third and fourth slice level signals, with the value of the third slice level signal lying intermediate the values of the second and the fourth slice level signals, and the current value of the signal indicative of the current value of the sync tip of the synchronisation pulse signal of the video signal being derived from the current value of at least one of the third and fourth slice level signals.

25. A method as claimed in claim 24 in which the value of the video signal is compared with the current value of the third slice level signal for determining third periods of the video signal during which the value of the video signal lies to the side of the current value of the third slice level signal as that to which the current value of the fourth slice level signal lies during the measuring period, and the value of the video signal is compared with the fourth slice level signal for determining fourth periods of the video signal during which the value of the video signal lies to the side of the current value of the fourth slice level signal opposite to that to which the current value of the third slice level signal lies during the measuring period, the third periods being compared with the second reference period, and the fourth periods being compared with a third reference period for determining if the value of the sync tip of the synchronisation pulse signal lies within the current values of the third and fourth slice level signals, the third reference period being less than the second reference period.

26. A method as claimed in claim 25 in which the third periods are summed prior to being compared with the second reference period, and the fourth periods are summed prior to being compared with the third reference period.

27. A method as claimed in claim 25 in which a third logic signal is derived from the comparison of the value of the video signal with the third slice level signal, the third logic signal being set at one of a logic high level and a logic low level during the third periods of the video signal, and at the other of the logic high level and logic low level when the value of the video signal does not correspond to the third periods, and a fourth logic signal is derived from the comparison of the value of the video signal with the fourth slice level signal, the fourth logic signal being set at one of a logic high level and a logic low level when the value of the video signal corresponds to the fourth periods and at the other of the logic high level and logic low level when the value of the video signal does not correspond to the fourth periods, the third and fourth logic signals being integrated during each measuring period, and one of the maximum and minimum values of the third logic signal being compared with the second reference period, and one of the maximum and minimum values of the integrated fourth logic signal being compared with the third reference period for determining if the value of the sync tip of the synchronisation pulse signal lies within the current values of the third and fourth slice level signals.

28. A method as claimed in claim 25 in which the third reference period corresponds to a period not greater than a period representative of the duration of the periods during which the value of the video signal would be expected to lie to the side of the value of the sync tip of the synchronisation pulse signal of the video signal to which the fourth slice level signal should lie as a result of noise during the measuring period.

29. A method as claimed in claim 25 in which the measuring period corresponds to one line of video data of the video signal, and the duration of the third reference period is approximately 0.75 microseconds.

30. A method as claimed in claim 25 in which the value of the at least one of the third and fourth slice level signals selected in a previous measuring period is altered in response to the comparison of the third and fourth periods with the second and third reference periods, respectively, in at least two subsequent measuring periods indicating that the value of the at least one of the third and fourth slice level signals should be selected for moving the third and fourth slice level signals consecutively in the same direction.

31. A method as claimed in claim 28 in which the values of the third and fourth slice level signals are incremented by a second predetermined increment if the synchronisation pulse signal of the video signal is a negative going pulse, and the sum of the third periods in the measuring period is less than the second reference period, or the sum of the fourth periods in the measuring period is less than the third reference period.

32. A method as claimed in claim 31 in which the values of the third and fourth slice level signals are decremented by a second predetermined decrement if the synchronisation pulse signal of the video signal is a negative going pulse, and the sum of the third periods in the measuring period is greater than the first reference period, or the sum of the fourth periods in the measuring period is greater than the second reference period.

33. A method as claimed in claim 31 in which each second predetermined decrement is of value similar to each second predetermined increment.

34. A method as claimed in claim 24 in which the value of the intermediate slice level signal is derived from the current value of the third slice level signal when the second amplitude band width does not exceed a second predetermined proportion of the difference between the expected current values of the blanking level and the sync tip of the synchronisation pulse signal of the video signal.

35. A method as claimed in claim 34 in which the value of the intermediate slice level signal is derived from the average of the current values of the third and fourth slice level signals when the second amplitude band width exceeds the second predetermined proportion of the difference between the expected values of the sync tip of the synchronisation pulse signal of the video signal.

36. A method as claimed in claim 24 in which the width of the second amplitude band width is selected in response to noise in the video signal.

37. A method as claimed in claim 24 in which the value of the third slice level signal is selectable, and the value of the fourth slice level is dependent on the value of the third slice level signal.

38. A method as claimed in claim 24 in which the value of the at least one of the third and fourth slice level signals is initially selected so that the expected value of the sync tip of the synchronisation pulse signal of the video signal lies within the third and fourth slice level signals.

39. A method as claimed in claim 1 in which the logic signal from which the synchronisation signal is produced is transitioned between the logic high and the logic low levels in response to each transition of the value of the video signal across the value of the intermediate slice level signal, the logic signal being transitioned from one of the logic high level and the logic low level to the other of the logic high level and the logic low level in response to the value of the video signal transitioning in one direction across the value of the intermediate slice level signal, and the logic signal being transitioned in the reverse direction in response to the value of the video signal transitioning in the reverse direction across the value of the intermediate slice level signal for producing the synchronisation signal with a synchronisation pulse signal.

40. A method as claimed in claim 1 in which a clamp and gain circuit for clamping and gaining the video signal is responsive to the current value of at least one of the first and second slice level signals for determining the blanking level of the video signal.

41. A method as claimed in claim 40 in which the clamp and gain circuit is responsive to the current value of the signal indicative of the value of the sync tip of the synchronisation pulse signal of the video signal.

42. A method as claimed in claim 40 in which the clamp and gain circuit is responsive to the current value of at least one of the third and fourth slice level signals.

43. A method as claimed in claim 2 in which the measuring period corresponds to one line of video data of the video signal, and the video signal is continuously subjected to the method during consecutive measuring periods.

44. A method as claimed in claim 1 in which the video signal is clamped to a reference signal, and the values of the first and second slice level signals are initially determined from the reference signal.

45. A method as claimed in claim 44 in which the values of the third and fourth slice level signals are initially determined from the reference signal.

46. A method as claimed in claim 1 in which the video signal is passed through a low pass filter for filtering out high frequency video data and noise from the video signal prior to selection of the value of the at least one of the first and second slice level signals.

47. A method as claimed in claim 46 in which the portion of the video signal corresponding to the synchronisation pulse signal after the video signal has been passed through the low pass filter is compared with the corresponding portion of the video signal prior to the video signal being passed through the low pass filter for determining the noise level in the video signal prior to selecting the width of the first amplitude band width.

48. A method as claimed in claim 1 in which the synchronisation pulse signal of the video signal is a horizontal synchronisation pulse signal.

49. A synchronisation signal generating circuit for generating a synchronisation signal from a video signal having a synchronisation pulse signal therein, the synchronisation signal generating circuit comprising:
  a circuit for generating a first slice level signal and a second slice level signal such that the first and second slice level signals define a first amplitude band width therebetween, the value of at least one of the first and second slice level signals being selectable,
  a circuit for selecting the value of the at least one of the first and second slice level signals, the value of which is selectable so that the second slice level signal lies on the side of the first slice level signal in a direction similar to that from which the sync pulse signal is expected to extend from the blanking level of the video signal, and the value of the blanking level of the video signal lies within the respective values of the first and second slice level signals,
  a circuit for deriving a value of an intermediate slice level signal from the current value of at least one of the first and second slice level signals and the current value of a signal indicative of the current value of the sync tip of the synchronisation pulse signal of the video signal, so that the value of the intermediate slice level signal lies intermediate the current value of the at least one of the first and second slice level signals and the current value of the signal indicative of the value of the sync tip of the synchronisation pulse signal of the video signal,
  a circuit for comparing the video signal with the intermediate slice level signal, and
  a circuit for producing the synchronisation signal by providing a logic signal at one of a logic high level and a logic low level and transitioning the logic signal from the one of the logic high level and the logic low level to the other of the logic high level and the logic low level in response to the value of the video signal transitioning in at least one direction across the value of the intermediate slice level signal.

50. A synchronisation signal generating circuit as claimed in claim 49 in which a clamp and gain circuit is provided for clamping and gaining the video signal, the clamp and gain circuit being responsive to the current value of at least one of the first and second slice level signals for determining the blanking level of the video signal.

51. A synchronisation signal generating circuit as claimed in claim 49 in which the clamp and gain circuit is responsive to the current value of the signal indicative of the value of the sync tip of the synchronisation pulse of the video signal.

52. A video signal decoding circuit comprising an active video signal processing and decoding stage, and a synchronisation pulse signal recovery circuit for recovering a synchronisation pulse signal from the video signal, the synchronisation pulse signal recovery circuit comprising the synchronisation signal generating circuit as claimed in claim 49 and the synchronisation pulse signal recovery circuit being in parallel with the video signal processing and decoding circuit.

* * * * *

UNITED STATES PATENT AND TRADEMARK OFFICE
CERTIFICATE OF CORRECTION

PATENT NO. : 7,327,399 B2  Page 1 of 1
APPLICATION NO. : 10/879248
DATED : February 5, 2008
INVENTOR(S) : Niall Daniel O'Connell It is certified that error appears in the above-identified patent and that said Letters Patent is hereby corrected as shown below:

<u>Column 1</u>
Line 22, replace the words "lock-In" with --lock-in--.

<u>Column 4</u>
Line 34, replace the word "fine" with --line--.

<u>Column 5</u>
Line 25, delete the word "is".

<u>Column 14</u>
Line 22, delete the first occurrence of the word "is".

<u>Column 18</u>
Line 54, replace the character "t" with the word --to--.
Line 61, before the word "have" insert the words --level 27--.

<u>Column 20</u>
Line 55, before the word "as" insert the word --illustrated--.
Line 66, replace the character "a" with the word --as--.

<u>Column 21</u>
Line 39, delete the character """ between the words "One" and "the".

<u>Column 28</u>
Line 28, delete the character "t" and replace with the word --it--.

Signed and Sealed this

Third Day of March, 2009

JOHN DOLL
*Acting Director of the United States Patent and Trademark Office*